US012777512B2

(12) United States Patent
Ganguly et al.

(10) Patent No.: US 12,777,512 B2
(45) Date of Patent: Oct. 27, 2026

(54) SCHEDULING WIRELESS COMMUNICATIONS BASED ON AGING METRIC

(71) Applicant: Globalstar, Inc., Covington, LA (US)

(72) Inventors: Shouvik Ganguly, San Diego, CA (US); Anthony Edet Ekpenyong, San Diego, CA (US); Hassan Mohamed Mostafa Abdalmageed Ghozlan, San Diego, CA (US); Peter John Black, La Jolla, CA (US)

(73) Assignee: Globalstar, Inc., Covington, LA (US)

( * ) Notice: Subject to any disclaimer, the term of this patent is extended or adjusted under 35 U.S.C. 154(b) by 396 days.

(21) Appl. No.: 18/318,236

(22) Filed: May 16, 2023

(65) Prior Publication Data

US 2023/0379960 A1 Nov. 23, 2023

Related U.S. Application Data

(60) Provisional application No. 63/365,111, filed on May 20, 2022, provisional application No. 63/365,113, filed on May 20, 2022.

(51) Int. Cl.

| | |
|---|---|
| ***H04W 72/543*** | (2023.01) |
| ***H04L 5/14*** | (2006.01) |
| ***H04L 25/02*** | (2006.01) |
| ***H04W 72/1263*** | (2023.01) |

(52) U.S. Cl.
CPC ............ *H04W 72/543* (2023.01); *H04L 5/14* (2013.01); *H04L 25/0224* (2013.01); *H04W 72/1263* (2013.01)

(58) Field of Classification Search
CPC .. H04W 72/543; H04W 72/1263; H04L 5/14; H04L 25/0224
See application file for complete search history.

(56) References Cited

U.S. PATENT DOCUMENTS

| | | | |
|---|---|---|---|
| 5,469,115 | A | 11/1995 | Peterzell |
| 5,617,060 | A | 4/1997 | Wilson |
| 5,757,858 | A | 5/1998 | Black |
| 5,870,431 | A | 2/1999 | Easton |
| 6,006,108 | A | 12/1999 | Black |
| 6,107,878 | A | 8/2000 | Black |
| 6,134,440 | A | 10/2000 | Black |
| 6,147,964 | A | 11/2000 | Black |

(Continued)

FOREIGN PATENT DOCUMENTS

WO WO 2021/003603 1/2021

OTHER PUBLICATIONS

International Search Report and Written Opinion in application no. PCT/US2023/067041, mailed on Aug. 31, 2023, in 9 pages.

(Continued)

*Primary Examiner* — Jackie Zuniga Abad
(74) *Attorney, Agent, or Firm* — Knobbe, Martens, Olson & Bear, LLP

(57) ABSTRACT

Aspects of this disclosure relate to scheduling wireless communications based on channel estimate aging. Channel estimates can be generated based on signals wirelessly transmitted by user equipments. Aging metrics associated with the channel estimates can be determined. Wireless communications with at least some of the user equipments can be scheduled based on the aging metrics.

19 Claims, 13 Drawing Sheets

(56) References Cited

U.S. PATENT DOCUMENTS

| | | | |
|---|---|---|---|
| 6,181,201 | B1 | 1/2001 | Black |
| 6,205,129 | B1 | 3/2001 | Esteves |
| 6,208,873 | B1 | 3/2001 | Black |
| 6,246,885 | B1 | 6/2001 | Black |
| 6,285,861 | B1 | 9/2001 | Bonaccorso |
| 6,363,102 | B1 | 3/2002 | Ling |
| 6,397,070 | B1 | 5/2002 | Black |
| 6,426,971 | B1 | 7/2002 | Wu |
| 6,434,376 | B1 | 8/2002 | Black |
| 6,449,490 | B1 | 9/2002 | Chaponniere |
| 6,466,558 | B1 | 10/2002 | Ling |
| 6,560,211 | B2 | 5/2003 | Esteves |
| 6,574,211 | B2 | 6/2003 | Padovani |
| 6,594,501 | B2 | 7/2003 | Black |
| 6,633,552 | B1 | 10/2003 | Ling |
| 6,661,833 | B1 | 12/2003 | Black |
| 6,671,495 | B1 * | 12/2003 | Lappetelainen ..... H04B 7/0808 455/562.1 |
| 6,678,257 | B1 | 1/2004 | Vijayan |
| 6,680,925 | B2 | 1/2004 | Wu |
| 6,680,968 | B2 | 1/2004 | Black |
| 6,687,510 | B2 | 2/2004 | Esteves |
| 6,693,920 | B2 | 2/2004 | Montojo |
| 6,694,469 | B1 | 2/2004 | Jalali |
| 6,700,880 | B2 | 3/2004 | Ling |
| 6,714,526 | B2 | 3/2004 | Wei |
| 6,725,028 | B2 | 4/2004 | Bonaccorso |
| 6,738,608 | B2 | 5/2004 | Black |
| 6,748,201 | B2 | 6/2004 | Black |
| 6,757,520 | B2 | 6/2004 | Attar |
| 6,798,736 | B1 | 9/2004 | Black |
| 6,813,478 | B2 | 11/2004 | Glazko |
| 6,894,994 | B1 | 5/2005 | Grob |
| 6,920,504 | B2 | 7/2005 | Bender |
| 6,985,516 | B1 | 1/2006 | Easton |
| 6,987,778 | B2 | 1/2006 | Sindhushayana |
| 7,010,073 | B2 | 3/2006 | Black |
| 7,020,225 | B2 | 3/2006 | Sindhushayana |
| 7,051,268 | B1 | 5/2006 | Sindhushayana |
| 7,068,707 | B2 | 6/2006 | Bender |
| 7,069,037 | B2 | 6/2006 | Lott |
| 7,072,628 | B2 | 7/2006 | Agashe |
| 7,079,550 | B2 | 7/2006 | Padovani |
| 7,088,701 | B1 | 8/2006 | Attar |
| 7,088,957 | B2 | 8/2006 | Ling |
| 7,106,782 | B2 | 9/2006 | Howard |
| 7,123,922 | B2 | 10/2006 | Chaponniere |
| 7,127,654 | B2 | 10/2006 | Jalali |
| 7,130,282 | B2 | 10/2006 | Black |
| 7,133,437 | B2 | 11/2006 | Black |
| 7,149,264 | B2 | 12/2006 | Black |
| 7,155,246 | B2 | 12/2006 | Bhushan |
| 7,177,648 | B2 | 2/2007 | Attar |
| 7,184,426 | B2 | 2/2007 | Padovani |
| 7,206,580 | B2 | 4/2007 | Black |
| 7,209,517 | B2 | 4/2007 | Sindhushayana |
| 7,228,148 | B2 | 6/2007 | Esteves |
| 7,239,622 | B2 | 7/2007 | Black |
| 7,239,847 | B2 | 7/2007 | Attar |
| 7,251,229 | B2 | 7/2007 | Montojo |
| 7,266,156 | B2 | 9/2007 | Montojo |
| 7,289,473 | B1 | 10/2007 | Padovani |
| 7,295,857 | B2 | 11/2007 | Joshi |
| 7,315,531 | B2 | 1/2008 | Black |
| 7,369,549 | B2 | 5/2008 | Wu |
| 7,376,209 | B2 | 5/2008 | Namgoong |
| 7,382,744 | B2 | 6/2008 | Bhushan |
| 7,411,930 | B2 | 8/2008 | Montojo |
| 7,450,943 | B2 | 11/2008 | Black |
| 7,499,427 | B2 | 3/2009 | Padovani |
| 7,525,909 | B2 | 4/2009 | Fan |
| 7,564,775 | B2 | 7/2009 | Jayaraman |
| 7,564,794 | B2 | 7/2009 | Montojo |
| 7,564,818 | B2 | 7/2009 | Black |
| 7,580,709 | B2 | 8/2009 | Black |
| 7,596,090 | B2 | 9/2009 | Black |
| 7,609,773 | B2 | 10/2009 | Bhushan |
| 7,613,978 | B2 | 11/2009 | Jalali |
| 7,620,005 | B2 | 11/2009 | Wei |
| 7,646,802 | B2 | 1/2010 | Black |
| 7,672,383 | B2 | 3/2010 | Namgoong |
| 7,693,213 | B2 | 4/2010 | Sindhushayana |
| 7,729,714 | B2 | 6/2010 | Black |
| 7,742,447 | B2 | 6/2010 | Joshi |
| 7,796,563 | B2 | 9/2010 | Wu |
| 7,817,677 | B2 | 10/2010 | Black |
| 7,817,760 | B2 | 10/2010 | Black |
| 7,826,441 | B2 | 11/2010 | Black |
| 7,830,900 | B2 | 11/2010 | Black |
| 7,835,695 | B2 | 11/2010 | Ling |
| 7,848,282 | B2 | 12/2010 | Padovani |
| 7,848,283 | B2 | 12/2010 | Padovani |
| 7,848,284 | B2 | 12/2010 | Padovani |
| 7,848,285 | B2 | 12/2010 | Padovani |
| 7,848,298 | B2 | 12/2010 | Attar |
| 7,869,387 | B2 | 1/2011 | Black |
| 7,876,265 | B2 | 1/2011 | Black |
| 7,893,873 | B2 | 2/2011 | Black |
| 7,924,753 | B2 | 4/2011 | Attar |
| 7,953,062 | B2 | 5/2011 | Sindhushayana |
| 7,961,592 | B2 | 6/2011 | Black |
| 7,995,531 | B2 | 8/2011 | Padovani |
| 7,995,684 | B2 | 8/2011 | Montojo |
| 8,005,042 | B2 | 8/2011 | Padovani |
| 8,009,625 | B2 | 8/2011 | Padovani |
| 8,010,113 | B2 | 8/2011 | Black |
| 8,040,942 | B2 | 10/2011 | Bhushan |
| 8,042,086 | B2 | 10/2011 | Tseng |
| 8,050,198 | B2 | 11/2011 | Bhushan |
| 8,077,655 | B2 | 12/2011 | Padovani |
| 8,085,678 | B2 | 12/2011 | Spindola |
| 8,089,924 | B2 | 1/2012 | Padovani |
| 8,094,623 | B2 | 1/2012 | Attar |
| 8,094,740 | B2 | 1/2012 | Bhushan |
| 8,102,872 | B2 | 1/2012 | Spindola |
| 8,111,663 | B2 | 2/2012 | Black |
| 8,116,283 | B2 | 2/2012 | Black |
| 8,126,072 | B2 | 2/2012 | Namgoong |
| 8,160,596 | B2 | 4/2012 | Black |
| 8,165,619 | B2 | 4/2012 | Attar |
| 8,175,594 | B2 | 5/2012 | Attar |
| 8,189,540 | B2 | 5/2012 | Padovani |
| 8,203,961 | B2 | 6/2012 | Yavuz |
| 8,204,470 | B2 | 6/2012 | Onggosanusi et al. |
| 8,213,390 | B2 | 7/2012 | Black |
| 8,218,573 | B2 | 7/2012 | Bhushan |
| 8,259,637 | B2 | 9/2012 | Bertrand et al. |
| 8,305,965 | B2 | 11/2012 | Shen et al. |
| 8,311,027 | B2 | 11/2012 | Padovani |
| 8,331,377 | B2 | 12/2012 | Attar |
| 8,331,385 | B2 | 12/2012 | Black |
| 8,351,372 | B2 | 1/2013 | Padovani |
| 8,363,697 | B2 | 1/2013 | Grob |
| 8,375,261 | B2 | 2/2013 | Shi |
| 8,380,240 | B2 | 2/2013 | Muharemovic et al. |
| 8,385,923 | B2 | 2/2013 | Attar |
| 8,391,337 | B2 | 3/2013 | Black |
| 8,406,774 | B2 | 3/2013 | Yavuz |
| 8,411,594 | B2 | 4/2013 | Black |
| 8,416,756 | B2 | 4/2013 | Bhushan |
| 8,472,322 | B2 | 6/2013 | Black |
| 8,483,223 | B2 | 7/2013 | Black |
| 8,493,942 | B2 | 7/2013 | Luo et al. |
| 8,494,593 | B2 | 7/2013 | Black |
| 8,514,738 | B2 | 8/2013 | Chandrasekhar et al. |
| 8,582,621 | B2 | 11/2013 | Grob |
| 8,583,137 | B2 | 11/2013 | Rezaiifar |
| 8,594,252 | B2 | 11/2013 | Black |
| 8,605,801 | B2 | 12/2013 | Rezaiifar |
| 8,611,303 | B2 | 12/2013 | Rezaiifar |
| 8,611,305 | B2 | 12/2013 | Black |
| 8,611,310 | B2 | 12/2013 | Black |
| 8,611,325 | B2 | 12/2013 | Black |
| 8,619,835 | B2 | 12/2013 | Grob |

(56) References Cited

U.S. PATENT DOCUMENTS 8,630,602 B2 1/2014 Attar
8,634,438 B2 1/2014 Nanda
8,638,758 B2 1/2014 Black
8,700,083 B2 4/2014 Yavuz
8,712,461 B2 4/2014 Yavuz
8,737,538 B2 5/2014 Grob
8,737,911 B2 5/2014 Black
8,743,909 B2 6/2014 Black
8,761,062 B2 6/2014 Chandrasekhar et al.
8,767,641 B2 7/2014 Chen et al.
8,773,308 B2 7/2014 Black
8,824,979 B2 9/2014 Yavuz
8,854,944 B2 10/2014 Jou
8,867,456 B2 10/2014 Yavuz
8,868,118 B2 10/2014 Rezaiifar
8,873,534 B2 10/2014 Sindhushayana
8,897,188 B2 11/2014 Black
8,909,279 B2 12/2014 Yavuz
8,923,125 B2 12/2014 Lott
8,929,908 B2 1/2015 Agrawal
8,948,095 B2 2/2015 Black
8,971,884 B2 3/2015 Ahluwalia
8,983,480 B2 3/2015 Rezaiifar
8,995,417 B2 3/2015 Jou
9,001,641 B2 4/2015 Bertrand et al.
9,001,735 B2 4/2015 Padovani
9,001,756 B2 4/2015 Chen et al.
9,014,152 B2 4/2015 Jou
9,020,009 B2 4/2015 Barriac
9,055,545 B2 6/2015 Black
9,059,785 B2 6/2015 Fertonani
9,066,306 B2 6/2015 Yavuz
9,071,344 B2 6/2015 Smee
9,072,102 B2 6/2015 Yavuz
9,078,269 B2 7/2015 Yavuz
9,084,242 B2 7/2015 Chen et al.
9,118,387 B2 8/2015 Padovani
9,119,217 B2 8/2015 Black
9,124,344 B2 9/2015 Padovani
9,131,420 B2 9/2015 Rezaiifar
9,137,806 B2 9/2015 Yavuz
9,154,277 B2 10/2015 Ekpenyong et al.
9,204,437 B2 12/2015 Smee
9,231,666 B2 1/2016 Muharemovic et al.
9,288,814 B2 3/2016 Yavuz
9,319,928 B2 4/2016 Bertrand et al.
9,344,973 B2 5/2016 Yavuz
9,363,764 B2 6/2016 Black et al.
9,374,791 B2 6/2016 Yavuz
9,401,748 B2 7/2016 Chen et al.
9,408,165 B2 8/2016 Jou
9,413,509 B2 8/2016 Chen et al.
9,419,751 B2 8/2016 Sindhushayana
9,473,219 B2 10/2016 Muharemovic et al.
9,491,722 B2 11/2016 Yavuz
9,525,477 B1 12/2016 Wu
9,532,230 B2 12/2016 Bendlin et al.
9,571,250 B2 2/2017 Chen et al.
9,585,150 B2 2/2017 Marsh
9,603,040 B2 3/2017 Chandrasekhar et al.
9,603,141 B2 3/2017 Chen et al.
9,628,311 B2 4/2017 Bertrand et al.
9,667,397 B2 5/2017 Chen et al.
9,680,522 B2 6/2017 Ekpenyong et al.
9,706,568 B2 7/2017 Ekpenyong
9,730,227 B2 8/2017 Marsh
9,762,372 B2 9/2017 Ekpenyong et al.
9,819,471 B2 11/2017 Chen et al.
9,877,230 B2 1/2018 Chen et al.
9,888,389 B2 2/2018 Bendlin et al.
9,893,800 B2 2/2018 Wu
9,900,856 B2 2/2018 Wu
9,923,690 B2 3/2018 Ekpenyong
9,955,476 B2 4/2018 Black
9,991,986 B2 6/2018 Sindhushayana
10,075,313 B2 9/2018 Black
10,158,393 B2 12/2018 Ekpenyong et al.
10,206,181 B2 2/2019 Ekpenyong et al.
10,334,450 B2 6/2019 Bendlin et al.
10,348,432 B2 7/2019 Chen et al.
10,404,442 B2 9/2019 Chen et al.
10,412,760 B2 9/2019 Ekpenyong
10,432,272 B1 10/2019 Black et al.
10,433,159 B2 10/2019 Ekpenyong et al.
10,454,569 B2 10/2019 Wu
10,476,627 B2 11/2019 Bhushan
10,485,019 B2 11/2019 Ekpenyong
10,506,573 B2 12/2019 Chen et al.
10,567,204 B2 2/2020 Bertrand et al.
10,575,229 B2 2/2020 Wu
10,582,458 B2 3/2020 Sadek
10,659,112 B1 5/2020 Black et al.
10,686,502 B1 6/2020 Zhao et al.
10,687,247 B2 6/2020 Chen et al.
10,693,692 B2 6/2020 Hadani et al.
10,694,453 B2 6/2020 Jha et al.
10,749,635 B2 8/2020 Li et al.
10,756,767 B1 8/2020 Jacobs et al.
10,756,795 B2 8/2020 Black et al.
10,756,860 B2 8/2020 Black et al.
10,785,699 B2 9/2020 Sirotkin et al.
10,812,216 B2 10/2020 Black et al.
10,868,065 B2 12/2020 Wang et al.
10,924,249 B2 2/2021 Chen et al.
10,985,813 B2 4/2021 Zhao et al.
10,992,358 B2 4/2021 Sirotkin et al.
10,999,753 B2 5/2021 Chandrasekhar et al.
11,005,632 B2 5/2021 Ekpenyong
11,012,224 B2 5/2021 Ekpenyong et al.
11,063,645 B2 7/2021 Black et al.
11,082,950 B2 8/2021 Li et al.
11,128,356 B2 9/2021 Black et al.
11,139,905 B2 10/2021 Chen et al.
11,147,053 B2 10/2021 Chen et al.
11,159,298 B2 10/2021 Kim et al.
11,177,919 B2 11/2021 Ekpenyong et al.
11,228,347 B2 1/2022 Black et al.
11,239,971 B2 2/2022 Chen et al.
11,290,163 B2 3/2022 Zhao et al.
11,290,172 B2 3/2022 Black et al.
11,411,778 B2 8/2022 Chen et al.
11,411,779 B2 8/2022 Black et al.
11,711,118 B2 7/2023 Black et al.
2004/0110525 A1 6/2004 Black
2006/0119356 A1 6/2006 Rabe et al.
2006/0217137 A1* 9/2006 Kushalnagar ........ H04B 17/345
455/501
2007/0066232 A1 3/2007 Black
2007/0086536 A1 4/2007 Ketchum et al.
2008/0032740 A1 2/2008 Joshi
2009/0080499 A1 3/2009 Yavuz
2009/0135754 A1 5/2009 Yavuz
2009/0163209 A1 6/2009 Black
2010/0046497 A1 2/2010 Jalali
2010/0153488 A1 6/2010 Mittal
2010/0215022 A1 8/2010 Black
2011/0222423 A1 9/2011 Spindola
2011/0235515 A1 9/2011 Dreyfus
2011/0310858 A1 12/2011 Tokgoz
2012/0039207 A1 2/2012 Eriksson et al.
2012/0063321 A1 3/2012 Chandrasekhar et al.
2012/0220286 A1 8/2012 Chen et al.
2014/0036859 A1 2/2014 Ekpenyong et al.
2014/0126491 A1 5/2014 Ekpenyong et al.
2014/0192740 A1 7/2014 Ekpenyong et al.
2014/0269616 A1 9/2014 Black
2016/0183248 A1 6/2016 Niu et al.
2016/0192388 A1 6/2016 Ekpenyong et al.
2016/0344526 A1 11/2016 Fan et al.
2017/0005741 A1 1/2017 Wu
2017/0019814 A1 1/2017 Determan
2017/0027017 A1 1/2017 Black
2018/0115973 A1 4/2018 Black
2019/0020457 A1* 1/2019 Soriaga ............... H04L 25/0398

(56) References Cited

U.S. PATENT DOCUMENTS

| | | | |
|---|---|---|---|
| 2019/0123779 A1 | 4/2019 | Ekpenyong et al. | |
| 2019/0191391 A1 | 6/2019 | Ekpenyong et al. | |
| 2019/0305882 A1 | 10/2019 | Wang | |
| 2019/0313259 A1 | 10/2019 | Bendlin et al. | |
| 2019/0394008 A1 | 12/2019 | Chen et al. | |
| 2020/0029203 A1 | 1/2020 | Ekpenyong et al. | |
| 2020/0067627 A1 | 2/2020 | Bhushan | |
| 2020/0092909 A1 | 3/2020 | Ekpenyong | |
| 2020/0195313 A1 | 6/2020 | Black et al. | |
| 2020/0195323 A1 | 6/2020 | Black et al. | |
| 2020/0213052 A1 | 7/2020 | Li et al. | |
| 2020/0252100 A1 | 8/2020 | Jacobs et al. | |
| 2020/0252107 A1 | 8/2020 | Jacobs et al. | |
| 2020/0295980 A1 | 9/2020 | Bertrand et al. | |
| 2020/0314691 A1 | 10/2020 | Chen et al. | |
| 2020/0322202 A1 | 10/2020 | Hadani et al. | |
| 2020/0359228 A1 | 11/2020 | Sirotkin et al. | |
| 2020/0403645 A1 | 12/2020 | Jacobs et al. | |
| 2021/0184821 A1 | 6/2021 | Chen et al. | |
| 2021/0258814 A1 | 8/2021 | Chandrasekhar et al. | |
| 2021/0266131 A1 | 8/2021 | Ekpenyong | |
| 2021/0273770 A1 | 9/2021 | Ekpenyong et al. | |
| 2021/0306039 A1* | 9/2021 | Vijayan | G06N 20/00 |
| 2021/0328920 A1 | 10/2021 | Kadous et al. | |
| 2021/0329486 A1 | 10/2021 | Kadous et al. | |
| 2021/0384948 A1 | 12/2021 | Black et al. | |
| 2021/0385035 A1 | 12/2021 | Ghozlan et al. | |
| 2021/0385868 A1 | 12/2021 | Ying et al. | |
| 2022/0006552 A1 | 1/2022 | Ghozlan et al. | |
| 2022/0015093 A1 | 1/2022 | Ying et al. | |
| 2022/0029725 A1 | 1/2022 | Chen et al. | |
| 2022/0030610 A1 | 1/2022 | Chen et al. | |
| 2022/0038164 A1 | 2/2022 | Wei et al. | |
| 2022/0039032 A1 | 2/2022 | Wei et al. | |
| 2022/0070921 A1* | 3/2022 | Xue | H04W 74/0808 |
| 2022/0123977 A1 | 4/2022 | Jiang et al. | |
| 2022/0123986 A1 | 4/2022 | Jiang et al. | |
| 2022/0140936 A1 | 5/2022 | Sun et al. | |
| 2022/0141843 A1 | 5/2022 | Sadeghi et al. | |
| 2022/0200833 A1* | 6/2022 | Bertrand | H04L 25/0228 |
| 2022/0345335 A1 | 10/2022 | Chen et al. | |
| 2022/0345336 A1 | 10/2022 | Black et al. | |
| 2022/0369101 A1 | 11/2022 | Sun et al. | |
| 2023/0003826 A1* | 1/2023 | Parker | G01S 5/0205 |
| 2024/0187063 A1* | 6/2024 | Jeon | H04B 7/0626 |
| 2024/0275548 A1* | 8/2024 | Lee | H04L 5/0051 |

OTHER PUBLICATIONS

Extended European Search Report in European Patent application No. 23808503.9, dated Jul. 7, 2026.

* cited by examiner

SCHEDULING WIRELESS COMMUNICATIONS BASED ON AGING METRIC

CROSS REFERENCE TO PRIORITY APPLICATIONS

This application claims the benefit of priority of U.S. Provisional Patent Application No. 63/365,113, filed May 20, 2022 and titled "SCHEDULING WIRELESS COMMUNICATIONS BASED ON AGING METRIC," and claims the benefit of priority of U.S. Provisional Patent Application No. 63/365,111, filed May 20, 2022 and titled "RATE SELECTION FOR WIRELESS COMMUNICATIONS BASED ON AGING METRIC," the disclosures of each of which are hereby incorporated by reference herein in their entireties and for all purposes.

BACKGROUND

Technical Field

Embodiments of this disclosure relate to wireless communications and, more specifically, to scheduling and/or rate selection for wireless communications.

Description of Related Technology

In a wireless communication system, there can be a plurality of user equipments (UEs) arranged to wirelessly communicate with a communications network. Channel estimates can be generated from reference signals, such as sounding reference signals. The channel estimates can be used to mitigate intra-cell interference. High data rates and/or low latency communications are typically desirable. There can be dense UE deployments where high data rates are desirable. There can be technical challenges with efficiently utilizing resources for wireless communications while maintaining relatively low intra-cell interference.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a method of scheduling wireless communications based on channel estimate aging. The method includes generating channel estimates based on signals wirelessly transmitted by user equipments, determining aging metrics associated with the channel estimates, and scheduling wireless communications with at least some of the user equipments based on the aging metrics.

The signals wirelessly transmitted by the user equipments can be sounding reference signals. A first sounding reference signal of the sounding reference signals can be wirelessly transmitted by a first user equipment of the user equipments in a first time slot. A second sounding reference signal of the sounding reference signals can be wirelessly transmitted by a second user equipment of the user equipments in a second time slot, where the second time slot following the first time slot.

The wireless communications can be time division duplexing (TDD) multiple-input multiple-output (MIMO) wireless communications.

An aging metric of the aging metrics can be solely based on a time delay associated with a respective channel estimate. An aging metric of the aging metrics can be based on a mobility of a channel associated with a respective channel estimate and a time delay associated with the respective channel estimate. An aging metric of the aging metrics can be based on a prediction of quality of a channel associated with a respective channel estimate and a time delay associated with the respective channel estimate.

The scheduling can include selecting a first group of antenna ports of the user equipments for wireless communication during a time slot based on respective first aging metrics of the aging metrics indicating lower channel uncertainty, and not scheduling a second group of antenna ports of the user equipments for wireless communication during the time slot based on respective second aging metrics of the aging metrics indicating high channel uncertainty. The scheduling can include using at least some of the aging metrics in determining user equipment priority for a time slot. The scheduling can include reducing a number of layers for the wireless communications for a time slot. The scheduling can include reducing a number of layers for the wireless communications for a time slot.

The scheduling can include using at least some of the aging metrics in determining user equipment priority for a time slot. The determining user equipment priority for the time slot can also be based on one or more Quality of Service metrics. The scheduling can include reducing a number of layers for the wireless transmissions for a time slot.

The scheduling can include reducing a number of layers for the wireless communications for a time slot.

The method can further include performing modulation and coding scheme selection for a group of antenna ports of the user equipments scheduled for a time slot based on at least some of the aging metrics.

Another aspect of this disclosure is non transitory, computer-readable storage that includes computer executable instructions, where the computer-executable instructions, when executed by a baseband unit, cause any of the methods disclosed herein to be performed.

Another aspect of this disclosure is a system for wireless communications. The system includes a baseband unit comprising at least one processor and storing instructions, wherein the instructions, when executed by the at least one processor, cause the baseband unit to perform operations. The operations include generating channel estimates based on signals received from user equipments, determining aging metrics associated with the channel estimates, and scheduling wireless communications with at least some of the user equipments based on the aging metrics.

The system can include the one or more radio units in communication with the baseband unit. The one or more radio units can be configured to wirelessly communicate with the at least some of the user equipments via the wireless communications. The one or more radio units can include distributed remote radio units.

Another aspect of this disclosure is a method of scheduling wireless communications. The method includes receiving sounding references signals from user equipments in different uplink slots, generating channel estimates based on the sounding reference signals received in the different uplink slots, and scheduling wireless communications with at least some of the user equipments based on when sounding references signals from the at least some of the user equipments were received.

Another aspect of this disclosure is a method of user equipment rate selection based on channel estimate aging.

The method includes generating channel estimates based on signals wirelessly transmitted by user equipments, determining aging metrics associated with the channel estimates, and performing modulation and coding scheme selection for a group of the user equipments based on at least some of the aging metrics.

Another aspect of this disclosure is a system for wireless communications. The system includes a baseband unit comprising at least one processor and storing instructions, wherein the instructions, when executed by the at least one processor, cause the baseband unit to perform operations. The operations include generating channel estimates based on signals received from user equipments, determining aging metrics associated with the channel estimates, and selecting a modulation and coding scheme for a group of the user equipments based on at least some of the gaining metrics. The system can include one or more radio units in communication with the baseband unit, where the one or more radio units are configured to wirelessly communicate with the group of the user equipments with the selected modulation and coding scheme. The one or more radio units can include distribute remote radio units.

Another aspect of this disclosure is computer-readable storage comprising instructions that, when executed by one or more processors, cause any of the methods disclosed herein to be performed.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1A:
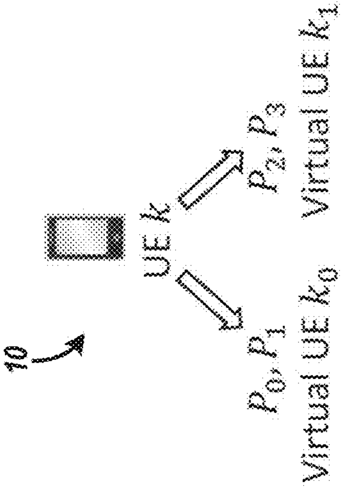
FIG. 1A illustrates a user equipment (UE) with antenna ports partitioned into groups.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Wireless communications systems can have specifications for a variety of communications parameters. For example, wireless communications systems can have specifications for high data rate applications, such as extended reality and/or enhanced mobile broadband applications. As another example, wireless communications systems can have specifications for ultra-reliable and low-latency applications. Wireless communications systems can have specification for other verticals including automotive and extensions of high data rate and/or ultra-reliable and low-latency, such as metaverse applications.

In practice, high data rate use cases can occur in dense small cell deployment scenarios. In such scenarios, user equipments (UEs) can be densely located in a particular geographic location. Multi-user multiple-input multiple-output (MU-MIMO) applications can offer a relatively high degree of spectral efficiency for a given bandwidth in such scenarios. Time division duplex (TDD) multiple-input multiple-output (MIMO) systems can support sounding reference signal (SRS) based downlink MU-MIMO by exploiting channel reciprocity. Channel state information (CSI) at a base station can be used to build a downlink precoder that mitigates and/or cancels intra-cell interference between data streams transmitted on the same time-frequency resource.

While channel estimates based on SRSs received from UEs can be used to mitigate intra-cell interference, the channel estimates can age. As more time passes from generating a channel estimate, there can be more uncertainty associated with the channel estimate. Channel estimate aging can reduce intra-cell orthogonality provided by a precoder as channel conditions can change since an SRS transmission from a UE. For example, the channel can evolve relative to when an SRS was transmitted from a UE due to mobility. With changes in channel conditions, the precoder can become out of date. Channel estimate aging can alternatively or additionally be impacted by processing and/or scheduling delays at a base station.

Another technical challenge is SRS capacity. There are finite SRS resources. This can limit a number of UEs and antenna ports per UE that can be sounded for downlink beamforming. During a particular time slot, only some UEs can transmit SRS in certain applications. Using aged channel estimates can result in aging effects and increased interference. For periodic SRS transmission, there is a tradeoff between increasing SRS periodicity to support more UEs versus performance loss due to channel aging.

Figure 1B:
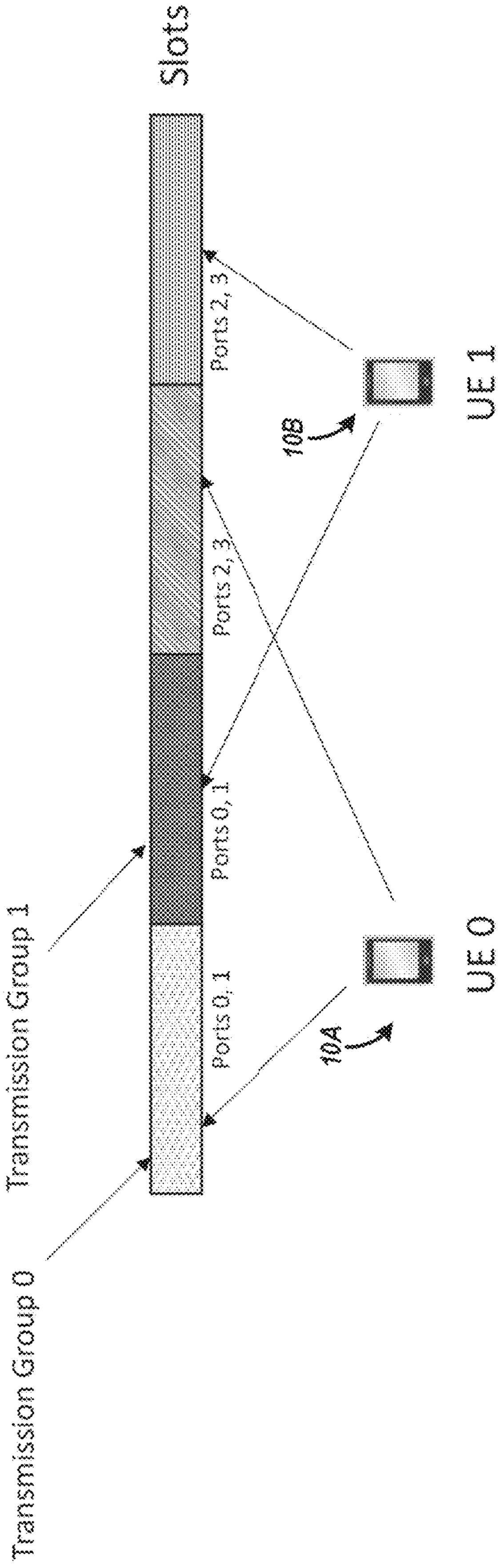
FIG. 1B illustrates a mapping of the groups of antenna ports of two UEs to time slots.

Efficient SRS resource utilization is desired. SRS resource utilization can be enhanced by partitioning UEs and their corresponding SRS antenna ports into different disjoint transmission groups (virtual UEs). FIG. 1A illustrates a UE with antenna ports partitioned into groups. FIG. 1B illustrates a mapping of the groups of antenna ports of two UEs to time slots.

FIG. 1A illustrates a UE 10 with SRS antenna ports $P_0$, $P_1$, $P_2$, and $P_3$ partitioned into two different transmission groups. A first transmission group includes SRS antenna ports $P_0$ and $P_1$ and corresponds to virtual $UE_0$. A second transmission group includes SRS antenna ports $P_2$ and $P_3$ can corresponds to virtual $UE_1$.

In certain applications like FIG. 1B, each transmission group in a wireless communications system can include a subset of the configured SRS antenna ports for a subset of UEs. Some or all of the transmission groups can include all antenna ports of one or more UEs for a subset of UEs in various applications. Some or all of the transmission groups can include a subset of antenna ports of one or more UEs in some applications. Different transmission groups can transmit in different time slots.

FIG. 1B illustrates a mapping of transmission groups to time slots for TDD wireless communications. In a first time slot, Transmission Group 0 can transmit. Transmission Group 0 includes SRS antenna ports P0 and P1 of a first UE 10A. In a second time slot, Transmission Group 1 can transmit. Transmission Group 1 includes SRS antenna ports P0 and P1 of a second UE 10B. In a third time slot, the first UE 10A can transmit from SRS antenna ports P2 and P3. In a fourth time slot, the second UE 10B can transmit from SRS antenna ports P2 and P3. As illustrated in FIG. 1B, the first UE 10A can have SRS antenna ports split into different transmission groups. SRS can be transmitted from these antenna ports at different times associated with the transmissions. Aging of SRS channel estimates can present technical problems. Even with efficient SRS resource utilization, there are technical challenges associated with channel estimate aging.

Aspects of this disclosure relate to scheduling wireless communications based on aging of SRS channel estimates. Such scheduling can mitigate channel estimate aging effects. UE selection can prioritize UEs that have more recently transmitted SRS. Rate selection and/or layer selection for selected UEs can be based on an aging metric. The aging metric is based on an age of an SRS channel estimate. In some instances, the aging metric is also based on one or more additional parameters, such as mobility and/or a measure of channel estimate quality. Taking into account aging of SRS channel estimates in scheduling wireless communications can be referred to as SRS-aware scheduling.

Methods of scheduling wireless communications based on aging of SRS estimates are disclosed. A first method involves only scheduling UEs that most recently transmitted SRS. A second method includes using SRS channel estimate aging in a UE priority computation, which is used to select UEs for scheduling. UEs with the highest UE priorities among all eligible UEs in each slot can be scheduled for transmission in that time slot. A third method includes scheduling fewer layers with increasing channel estimate age to mitigate aging effects. Any suitable principles and advantages of these methods can be implemented together with each other. With any of the scheduling methods, modulation and coding scheme (MCS) selection can also be performed based on the aging metrics for the scheduled UEs. The methods of scheduling wireless communications disclosed herein can be performed by any suitable circuitry and/or hardware, such as a baseband unit (BBU) of a base station specifically configured to perform operations of the method. Such a BBU can include at least one processor and store instructions that, when executed by the at least one processor, cause some or all of the operations of the methods disclosed here to be performed. In some instances, the BBU includes a Centralized Unit (CU) and at least one Distributed Unit (DU). Example methods of scheduling wireless communications based on aging of SRS channel estimates will be discussed with reference to FIGS. 2 to 5B.

Figure 2:
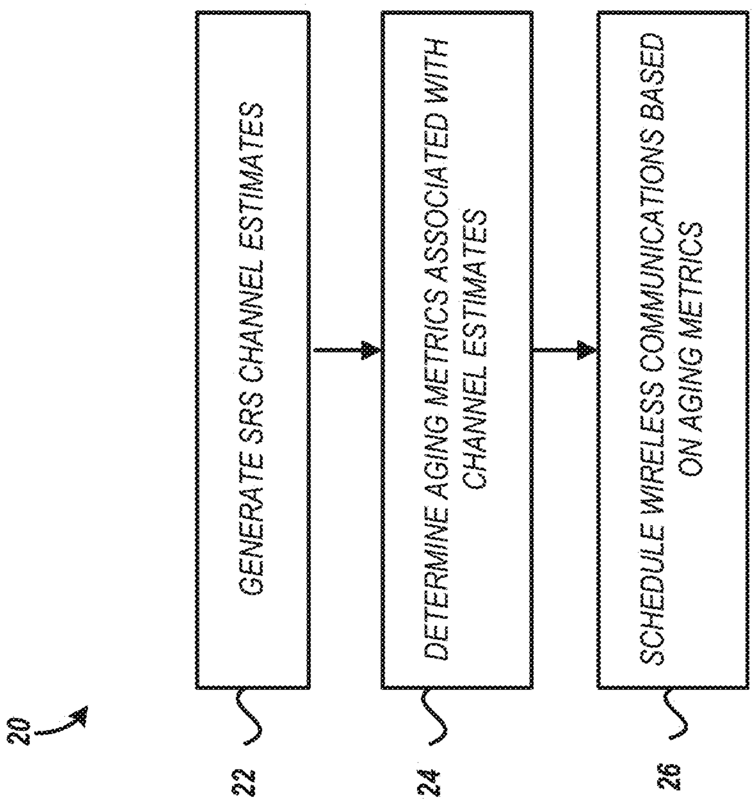
FIG. 2 is a flow diagram of a method of scheduling wireless communications according to an embodiment.

FIG. 2 is a flow diagram of a method 20 of scheduling wireless communications according to an embodiment. UEs can wirelessly transmit SRS to a network system. The network system can receive the SRS. At block 22, the network system can generate channel estimates based on the SRS received from the UEs. A BBU can generate the channel estimates.

Aging metrics can be determined for the channel estimates at block 24. The aging metrics are based on ages of the corresponding channel estimates. An aging metric can be based purely or solely on a time delay associated with a channel estimate. The time delay can represent how long ago the channel was sampled. The time delay can be indicative of the delay between the SRS transmission and/or reception and scheduling. For example, the aging metric can be or represent a time stamp associated with a channel estimate, an amount of time since a channel estimate was generated, or an amount of time since an SRS was received. The aging metric can be based on a time delay associated with a channel estimate and one or more other parameters.

In certain applications, an aging metric can also be based on Doppler of a channel. In such applications, determining an aging metric at block 24 can include estimating Doppler of a channel. Such an aging metric is based on a time delay and the mobility of the channel. A high aging metric value indicating high channel aging can be a result of a low time delay and a high channel mobility. A high aging metric value indicating high channel aging can be a result of a high time delay and a low channel mobility.

In some applications, an aging metric can be based on a time delay and a measure of prediction quality of the channel. In such applications, determining an aging metric at block 24 can include estimating prediction quality of the channel. A high aging metric value indicating high channel aging can be a result of a high prediction error. A low aging metric value indicating low channel aging can be a result of a low prediction error. A low aging metric value indicating low channel aging is possible for a low prediction error even in the case of high mobility.

At block 26, wireless communications can be scheduled based on the aging metrics. The aging metrics can each be associated with a respective channel associated with a UE antenna port. Then data can be wirelessly transmitted data to at least some of the user equipments as part of the wireless communications. The wireless communications can be TDD MIMO wireless communications. The scheduling can involve one or more of only scheduling UEs that most recently transmitted SRS, using SRS channel estimate aging in a UE priority computation, or scheduling fewer layers with increasing channel estimate age. A modulation and coding scheme selection for a group of the user equipments scheduled during a time slot can be performed based on at least some of the aging metrics.

Although channel estimate aging may be discussed herein with reference to uplink SRS reception, any suitable principles and advantages disclosed herein can be applied to channel state information (CSI) measurements and/or data received by a base station from a UE. CSI can be obtained from feedback of UE measurements.

Figure 3:
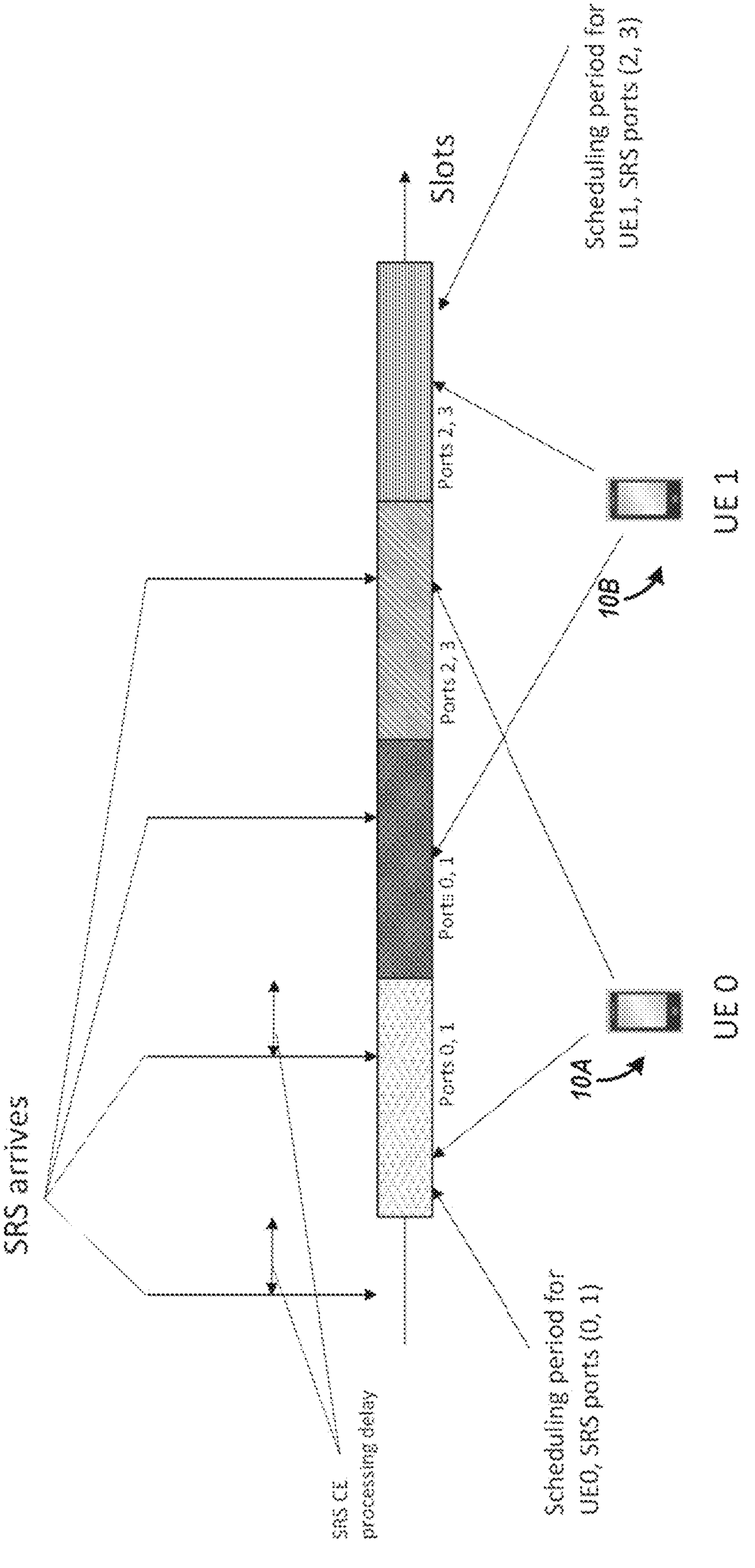
FIG. 3 is a diagram that illustrates a mapping of transmission groups to time slots for time division duplexing (TDD) wireless communications where UE antenna ports with the most recent sounding reference signal (SRS) channel estimates are scheduled according to an embodiment.

FIG. 3 is a diagram that illustrates a mapping of transmission groups to time slots for TDD wireless communications where UE antenna ports with the most recent SRS channel estimates are scheduled according to an embodiment. UEs 10A and 10B can each have four antenna ports. The antenna ports can be physical antennas. The transmission groups can be divided as discussed with reference to FIG. 1B. Before each time slot, UE antenna ports can transmit SRS. For example, SRS wirelessly transmitted from antenna ports P0 and P1 of a first UE 10A can be received before a first time slot. There is an SRS channel estimate processing delay between receiving an SRS and generating a channel estimate. After this processing delay, wireless communications associated with the channel can be scheduled.

In each time slot shown in FIG. 3, a group of UE antenna ports with the most recent SRS channel estimates is scheduled for wireless communication with a network. This can mitigate issues with channel aging by using fresh SRS channel estimates. Channel estimates generated based on the SRS received from the antenna ports P0 and P1 of the first UE 10A are the most recent for a first time slot. Wireless communications with the antenna ports P0 and P1 of the first UE 10A can be scheduled for the first time slot. Channel estimates generated based on the SRS received from the antenna ports P0 and P1 of the second UE 10B are the most recent for a second time slot. Wireless communications with the antenna ports P0 and P1 of the second UE 10B can be scheduled for the second time slot. Channel estimates generated based on the SRS received from the antenna ports P2 and P3 of the first UE 10A are the most recent for a third time slot. Wireless communications with the antenna ports P2 and P3 of the first UE 10A can be scheduled for the third time slot. Channel estimates generated based on the SRS received from the antenna ports P2 and P3 of the second UE 10B are the most recent for a fourth time slot. Wireless communications with the antenna ports P2 and P3 of the second UE 10B can be scheduled for the fourth time slot.

Although FIG. 3 is discussed with reference to time slots, one or more of the time slots of FIG. 3 can represent a group of two or more time slots in certain applications. A scheduling window can refer to one or more time slots where one or more UEs are available for scheduling. Example scheduling windows where a plurality of UEs are available for scheduling during several time slots are discussed with reference to FIGS. 8 and 9.

In the example of FIG. 3, two UEs 10A and 10B with 4 antenna ports each are divided into groups for wireless communications. Any suitable number of UEs and/or antenna ports can be scheduled for time slots for a particular application.

UE priority can be adjusted based on channel estimate aging. UE priority can be computed from one or more of the following Quality of Service (QoS) metrics for data or application: traffic type, latency budget, reliability, or throughput/goodput. A channel estimate aging metric can be incorporated into a UE priority determination. Accordingly, UE priority can be determined using an aging metric and one or more QoS metrics.

For example, user data can be classified into different queues based on one or more QoS metrics. UE priority can be determined based on queue priority, proportional-fair scheduling (PFS) priority and channel aging priority. As an example, for scheduling at time t+τ using channel estimate from time t, UE priority can be represented by Equation 1.

$$\text{UE priority} = \text{queue priority} + \frac{r(t)}{\bar{R}(t)} + \text{channel age priority}(\tau) \quad \text{(Eq. 1)}$$

In Equation 1, $$\frac{r(t)}{\bar{R}(t)}$$

is the PFS priority, computed as the ratio of the instantaneous achievable data rate r(t) to the average served data rate R(t), and the channel age priority is a decreasing function of the channel age T.

PFS priority can aim for fair allocation of data rate among UEs. PFS priority can be computed as the ratio of instantaneous data rate to historic throughput. Channel age priority can decrease with increasing age of utilized SRS channel estimate.

Figure 4A:
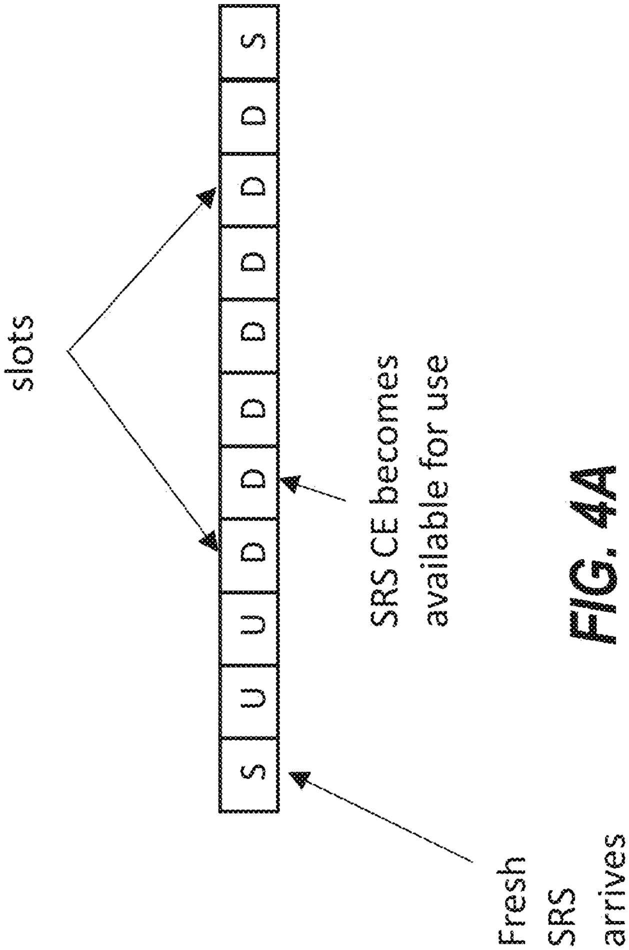
FIG. 4A is a timing diagram that illustrates an example frame structure and a processing delay associated with a channel estimate.

FIG. 4A is a timing diagram that illustrates an example frame structure with special slots (S), uplink slots (U), and downlink slots (D). This example frame structure includes a special slot followed by 2 uplink slots followed up 7 downlink slots. As shown in FIG. 4A, an SRS can be received in a special slot. The SRS channel estimate can be available for use after a processing delay. For example, the SRS channel estimate can be ready for use for a second downlink slot of the example frame structure shown in FIG. 4A.

The periodicity of SRS transmissions can change over time. In some instances, an SRS can be received from an antenna port of a UE each frame or cycle. In some other instances, an SRS can be received from an antenna port of a UE every 4 frames or cycles (e.g., in the example discussed with reference to FIG. 3). With varied time between SRS transmissions, channel age priority can be used in computing UE priority. In FIG. 4A, the wireless communication in downlink time slots can be scheduled using UE priority that is based on channel age priority. After the channel estimate and corresponding channel age priority, the channel age priority can be used to determine which UEs and antenna ports to schedule in downlink time slots.

Figure 4B:
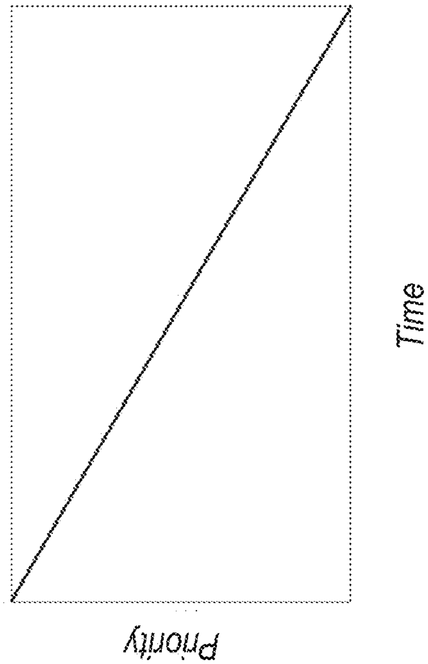
FIG. 4B is a graph illustrating an example channel age priority over time.

FIG. 4B is a graph illustrating an example channel age priority over time. The channel aging priority can be monotonically decreasing with time between consecutive SRS transmissions. The channel aging priority can be available with a corresponding SRS channel estimate.

A number of layers for MIMO communications can be reduced based on channel estimate aging. With aging channel estimates, there can be increased intra-cell interference. A total number of scheduled layers per cluster of UEs for wireless communications can be reduced as channel estimates age to mitigate intra-cell interference associated with channel estimate aging. In some applications, a total number of layers for wireless communication with a UE can be reduced based on aging of one or more channel estimates associated with the UE.

Figure 5A:
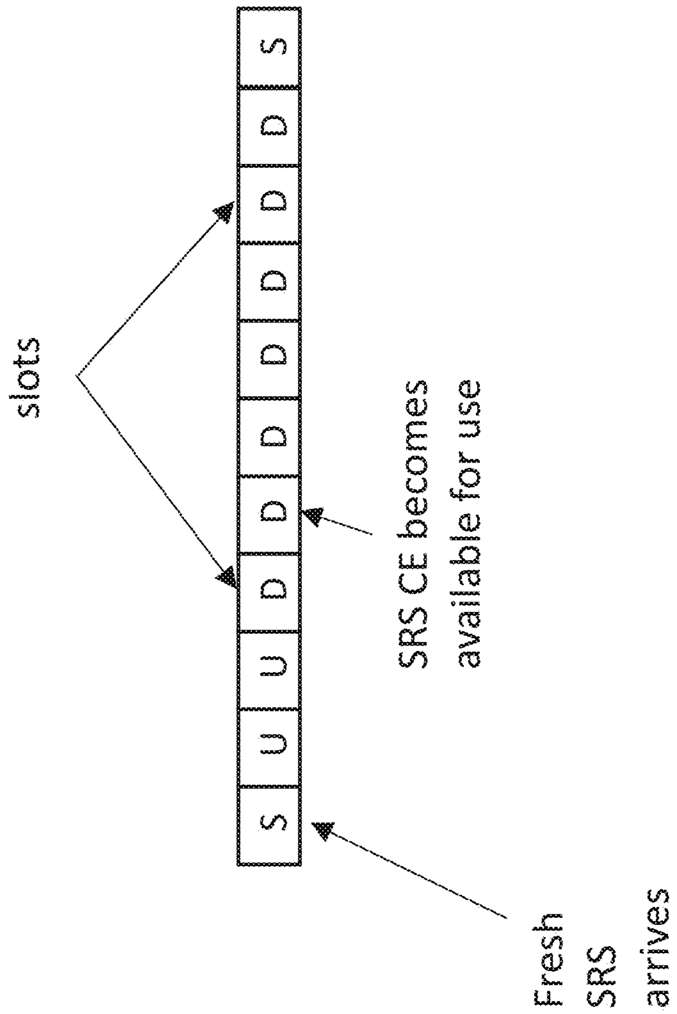
FIG. 5A is a timing diagram that illustrates an example frame structure and a processing delay associated with a channel estimate.

FIG. 5A is a timing diagram that illustrates an example frame structure with special slots (S), uplink slots (U), and downlink slots (D). A maximum number of layers for wireless communications can be highest when an SRS channel estimate is ready for use. The maximum number of layers can then decrease monotonically over time after the SRS channel estimate is ready. With more uncertainty about the SRS channel estimates, fewer layers can be used for wireless communications. This can mitigate intra-cell interference associated with aging channel estimates. In FIG. 5A, the wireless communication in downlink time slots can be scheduled with fewer layers as channel estimate aging increases. For example, more layers can be scheduled in the second downlink time slot when an SRS channel estimate becomes available and fewer layers can be scheduled in a seventh downlink time slot when more time has elapsed since the SRS has been received.

Figure 5B:
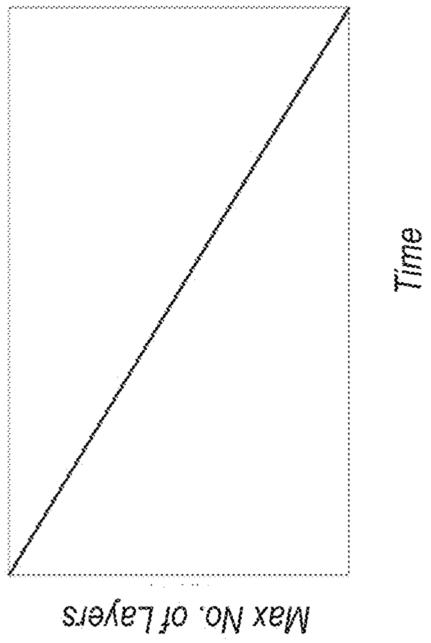
FIG. 5B is a graph illustrating an example reduction in layers for wireless communications over time due to channel estimate aging.

FIG. 5B is a graph illustrating an example reduction in layers for wireless communications over time due to channel estimate aging. A maximum number of layers to schedule per cluster of UEs can decrease monotonically with time between consecutive SRS transmissions. The maximum number of layers can be available with a corresponding SRS channel estimate for scheduling wireless communications with a cluster of UEs.

Aspects of this disclosure relate to rate selection based on aging of SRS channel estimates. Such rate selection can mitigate channel estimate aging effects. Modulation and coding scheme (MCS) can be selected based on an aging metric. With aging metrics indicating more channel estimate aging, MCS can be reduced. A backoff in decibels for MCS can be proportional to the aging metric in certain applications. MCS selection based on an aging metric can be implemented with any suitable principles and advantages of the SRS-aware scheduling disclosed herein. Taking into account aging of SRS channel estimates in rate selection can be referred to as SRS-aware rate selection.

Figure 6:
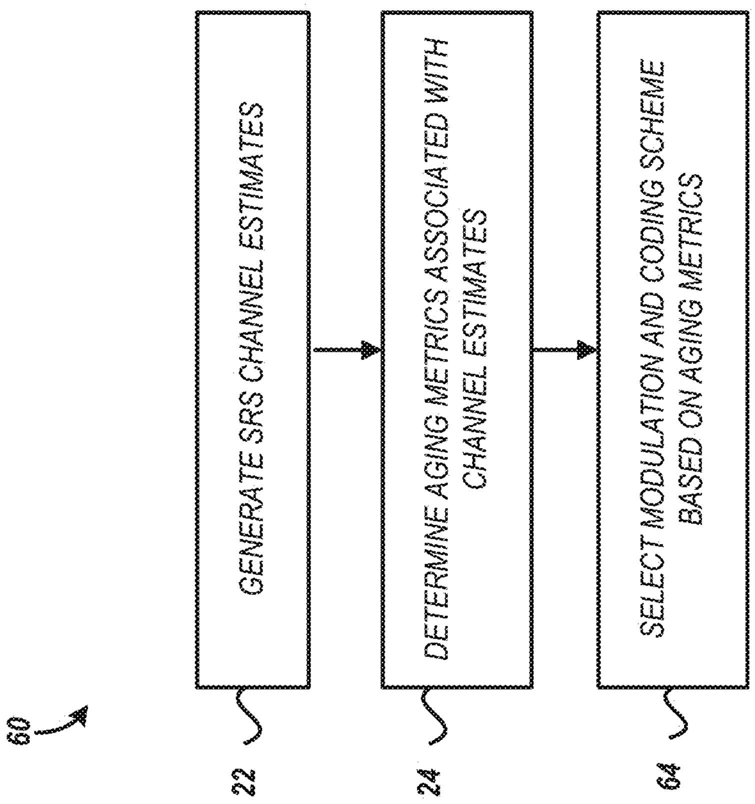
FIG. 6 is a flow diagram of a method of rate selection according to an embodiment.

FIG. 6 is a flow diagram of a method 60 of rate selection according to an embodiment. UEs can wirelessly transmit SRS to a network system. In the method 60, channel estimates can be generated at block 22 and aging metrics associated with the channel estimates can be determined at block 24 in accordance with any suitable principles and advantages discussed above, for example, with reference to the method 20 of FIG. 2.

At block 64, MCS selection for user equipments can be performed based on aging metrics. The aging metrics can be at least some of the aging metrics determined at block 24.

The MCS selection can include applying a backoff in an inner loop signal-to-interference-plus-noise-ratio (SINR) computation for selected UEs. The backoff can be proportional in decibels (dB) to an age of a utilized SRS channel estimate.

For MCS selection that does not take into account SRS channel estimate aging, MCS can be based on inner loop SINR and ACK/NACK feedback from UE (outer loop). Such MCS can be performed in accordance with Equation 2.

$$MCS(u) = f\left(SINR^{CQI}(u),\ \delta_{MCS}^{OL}(u)\right) \quad \text{(Eq. 2)}$$

As an example, MCS(u) can be a function in the form shown in Equation 3. The term $$\delta_{MCS}^{OL}(u)$$

can represent a backoff term due to ACK/NACK feedback from the UE.

$$MCS(u) = f\left(SINR^{CQI}(U)\right) - \delta_{MCS}^{OL}(u) \quad \text{(Eq. 3)}$$

Even with SRS-aware scheduling, some UEs with high priority can be scheduled despite aged channel estimates. For example, UEs with high priority can be scheduled due to one or more of QoS, latency specification, retransmissions, or the like. Precoder and rate selection for these UEs can be potentially based on aged channel estimates. This can lead to performance degradation. Accordingly, SRS channel estimate aging can be taken into account for rate (e.g., MCS) selection. An aging metric can be incorporated into MCS selection. MCS backoff can be applied proportional to SRS channel estimate age and/or an aging metric in accordance with any suitable principles and advantages disclosed herein. This SRS-aware MCS selection can be performed in according with Equation 4 and/or 5, in which aging backoff is an aging metric. The term $$\delta_{MCS}^{OL}(u)$$

can represent an outer loop backoff term due to ACK/NACK feedback from the UE.

$$MCS(u) = f\left(SINR^{CQI}(u),\ \delta_{MCS}^{OL}(u),\ \text{aging metric}\right) \quad \text{(Eq. 4)}$$

As an example, MCS(u) can be a function in the form shown in Equation 5.

$$MCS(u) = f\left(SINR^{CQI}(u)\right) - \delta_{MCS}^{OL}(u) - \text{aging backoff} \quad \text{(Eq. 5)}$$

The MCS selection can be applied together with any suitable principles and advantages of SRS-aware scheduling disclosed herein.

The MCS selection can be performed for UEs scheduled for TDD MIMO communications in a particular time slot. The MCS selection can be performed for UEs scheduled based on aging metrics determined at block 24. After the MCS is selected, a network system can wirelessly communicate with UEs with the selected modulation and coding scheme. Such wireless communications can be TDD MIMO communications.

Figure 7:
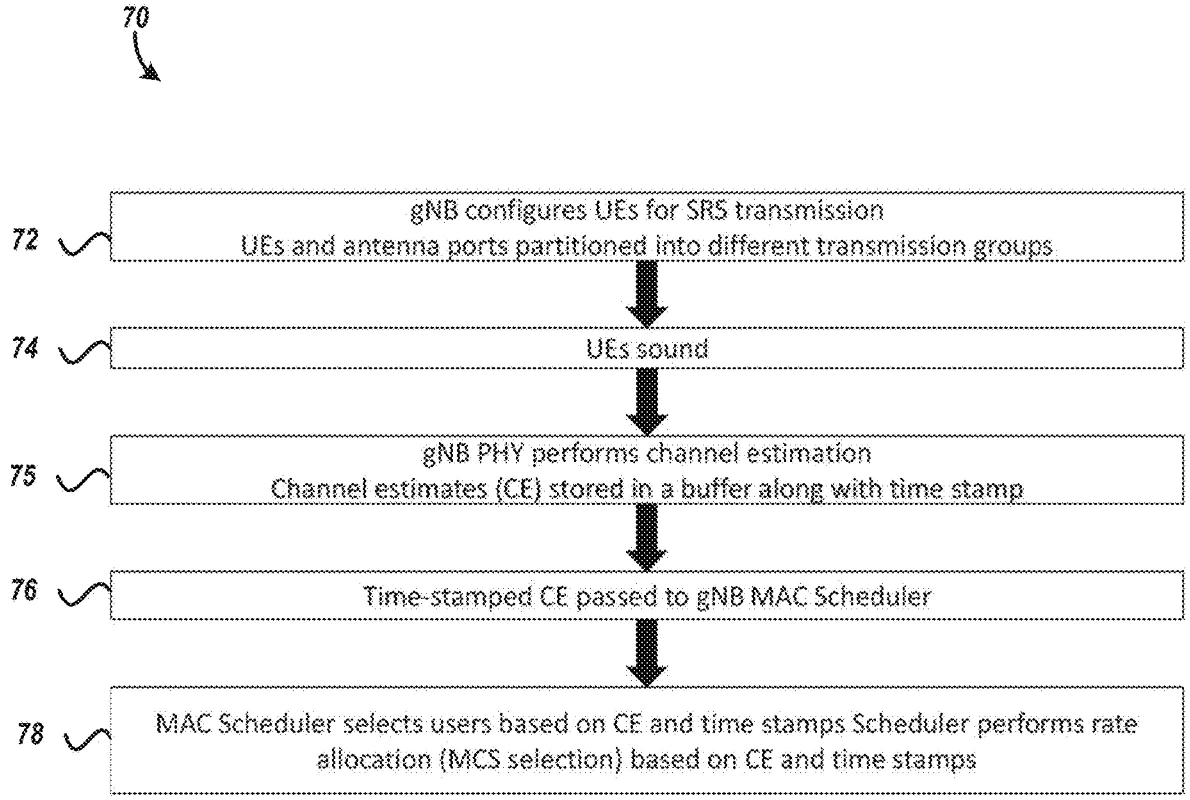
FIG. 7 is a flow diagram of a method of scheduling wireless communications according to an embodiment.

FIG. 7 is a flow diagram of a method 70 of scheduling wireless communications according to an embodiment. At block 72, a base station, such as a gNodeB (gNB), can configure UEs for SRS transmission. UEs and antenna ports can be partitioned into different transmission groups. An example of such partitioning can include grouping UEs and antenna ports as discussed with reference to FIGS. 1A and 1B. Then UEs can wirelessly transmit SRS at block 74. The antenna ports of the transmission groups can each transmit SRS in respective time slots.

A baseband unit (BBU) of a base station can perform channel estimation based on received SRS at block 75. For example, a gNB can perform channel estimation based on SRS at a physical layer (PHY). The channel estimates can be stored in a buffer with a timing information, such as time stamps. The timing information is indicative of when an SRS was wirelessly transmitted. The timing information is indicative of when an SRS channel estimate was generated. The timing information is indicative of aging of the channel estimate.

The channel estimates and timing information can be provided to a scheduler of a BBU at block 76. The scheduler can be a media access control (MAC) scheduler. The scheduler can be included in a gNB. The scheduler can perform scheduling and rate selection at block 78. The scheduling can involve selecting UEs and/or antenna ports for wireless communication in a particular time slot based on the channel estimates and the timing information. The scheduling can be implemented with any suitable principles and advantages disclosed herein, for example, with reference to one or more of FIGS. 2 to 5B. The scheduler can perform rate selection based on channel estimates and timing information. For example, MCS selection can be performed based on channel estimates and time stamps associated with the channel estimates. The rate selection can be implemented with any suitable principles and advantages disclosed herein, for example, with reference to FIG. 6.

In some cases, a UE is scheduled regardless of channel aging to meet a QoS parameter, such as end-to-end latency or guaranteed bit rate (GBR). Scheduling UEs and/or antenna ports with the most recent SRS channel estimates only based on aging metrics may not be sufficient to handle such cases. A different method or a combination of methods can meet the QoS parameters for such cases. A scheduler can handle such cases by trading off cell throughput to achieve minimum QoS acceptance metrics.

Figure 8:
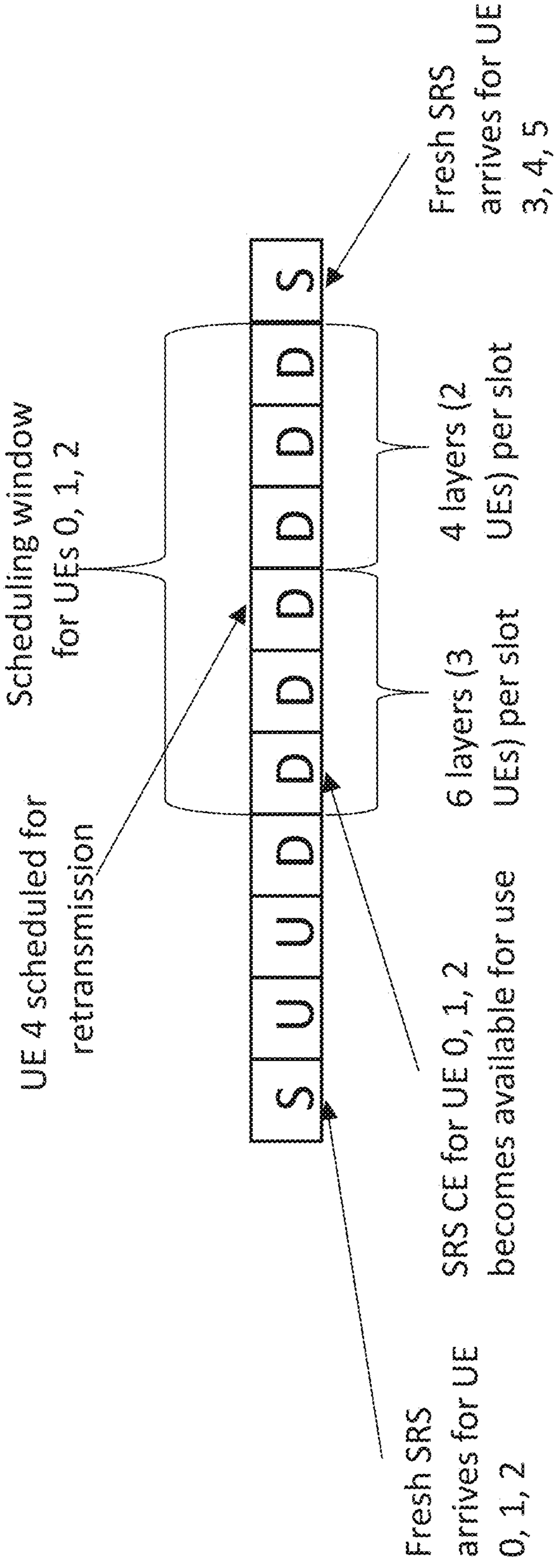
FIG. 8 is a timing diagram that illustrates handling retransmission in SRS-aware scheduling according to an embodiment.

FIG. 8 is a timing diagram that illustrates handling retransmission in SRS-aware scheduling according to an embodiment. To prioritize retransmissions to reduce and/or minimize latency, a combination of methods discussed above can be implemented. In the example shown in FIG. 8, there are 6 UEs with 2 layers each in a TDD system. A frame can include 10 time slots, time slot 0 to time slot 9. The UEs can be divided into two groups that each sound in different special slots. In time slot 0, UEs 0, 1, 2 transmit SRS. UEs 3, 4, 5 transmit SRS in time slot 10. The SRS channel estimates can be ready for use for UEs 0, 1, 2 at time slot 4.

UEs 0, 1, 2 can be available for scheduling wireless communications in time slots 4 to 9. For these time slots, UEs 0, 1, and 2 with the most recent SRS channel estimates are available for scheduling during a scheduling window that spans time slots 4 to 9.

UE 4 can be in a retransmission queue in time slot 6. The priority of UE 4 can be bumped up for time slot 6 due to being in a retransmission queue. An aging metric can be incorporated into the UE priority computation. UE 4 can have high priority for retransmission and UEs 0, 1, and 2 can have relatively high priority due to having more recent SRS channel estimates. UE 4 can be scheduled for retransmission in time slot 6 due to its high priority. In time slot 6, two of UEs 0, 1, and 2 can also be scheduled for wireless communication.

The number of layers scheduled can be reduced with increased aging of channel estimates. While 6 layers (3 UEs with 2 layers each) can be scheduled in time slots 4 to 6, 4 layers (2 UEs with 2 layers each) can be scheduled in time slots 7 to 9.

Rate selection can account for channel estimate aging. The MCS of the selected UEs can be reduced in a later downlink time slot relative to an earlier time slot in FIG. 8. The MCS of the selected UEs can be backed off every time slot in FIG. 8.

Figure 9:
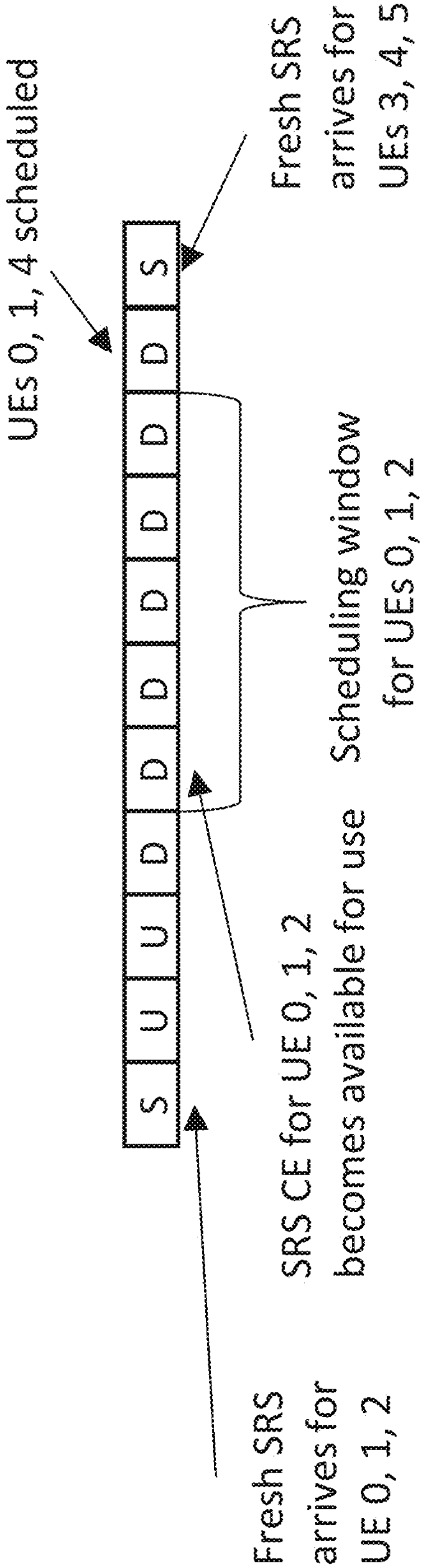
FIG. 9 is a timing diagram that illustrates prioritizing a UE with a guaranteed bit rate (GBR) quality of service (QoS) specification and SRS-aware scheduling according to an embodiment.

FIG. 9 is a timing diagram that illustrates prioritizing a UE with a guaranteed bit rate (GBR) QoS specification and SRS-aware scheduling according to an embodiment. To meet a GBR QoS specification and also mitigate channel aging effects, a combination of methods discussed above can be implemented. In the example shown in FIG. 9, there are 6 UEs with 2 layers each in a TDD system. UEs 2 and 4 can be in a GBR queue.

A frame can include 10 time slots, time slot 0 to time slot 9. The UEs can be divided into two groups that each sound in different special slots. In time slot 0, UEs 0, 1, 2 transmit SRS. UEs 3, 4, 5 transmit SRS in time slot 10. The SRS channel estimates can be ready for use for UEs 0, 1, 2 at time slot 4.

UEs 0, 1, 2 can be available for scheduling wireless communications in time slots 4 to 8. For these time slots, UEs 0, 1, and 2 with the most recent SRS channel estimates are available for scheduling during a scheduling window that spans time slots 4 to 8.

UE 2 can satisfy its GBR specification in time slot 8. UE 4 can be in a GBR queue in time slot 9. An aging metric can be incorporated into the UE priority computation. UE 4 can have high priority for meeting its GBR specification for time slot 9. UEs 0 and 1 can have relatively high priority due to having more recent SRS channel estimates and having one or more other parameters associated with higher priority than UE 2. UE 4 can be scheduled for wireless communication in time slot 9 due to its high priority. UE 4 can satisfy its GBR specification with wireless communication in time slot 9. In time slot 9, UEs 0 and 1 also be scheduled for wireless communication.

Rate selection can account for channel estimate aging. The MCS of the selected UEs can be reduced in a later downlink time slot than an earlier time slot in FIG. 9. The MCS of the selected UEs can be backed off every time slot in FIG. 9.

Downlink performance can be improved by maximizing the coherence between the actual channel and the assumed channel for precoding. This can be achieved by using channel estimates with reduced SRS aging and/or by SRS prediction. Aging reduction is possible if a subset of UEs are in high mobility and have channel estimates with high aging. When most or all UEs are in high mobility, a different approach can be advantageous.

It can be desirable to have SRS aging be relatively constant across downlink slots. SRS aging can be more similar across downlink slots with staggered SRS transmission during uplink slots. In certain applications, SRS channel estimate aging can be relatively constant by performing SRS sounding in uplink slots that are mapped one-to-one with downlink slots. In such applications, UEs scheduled in downlink slots can be based on when the UEs transmitted SRS in uplink slots.

Although SRS are transmitted in special slots in certain embodiments disclosed herein, SRS can alternatively or additionally be transmitted in uplink slots. Transmitting SRS in uplink slots can allow for staggered transmission of SRS. With staggered SRS transmission, SRS channel estimates can be available at different times. There can be a higher probability that minimum latency or reduced latency SRS estimates are available with staggered SRS transmission compared to SRS transmissions in special slots only. By scheduling wireless communications in downlink slots based on aging in accordance with principles and advantages disclosed herein, the staggered SRS channel estimates can improve downlink performance.

In an example method, SRS can be received from UEs in different uplink slots. Channel estimates based on the SRSs received in the different uplink slots can be generated. Wireless communications can be scheduled with at least some of the user equipments based on when sounding references signals from the at least some of the user equipments were received.

Figure 10:
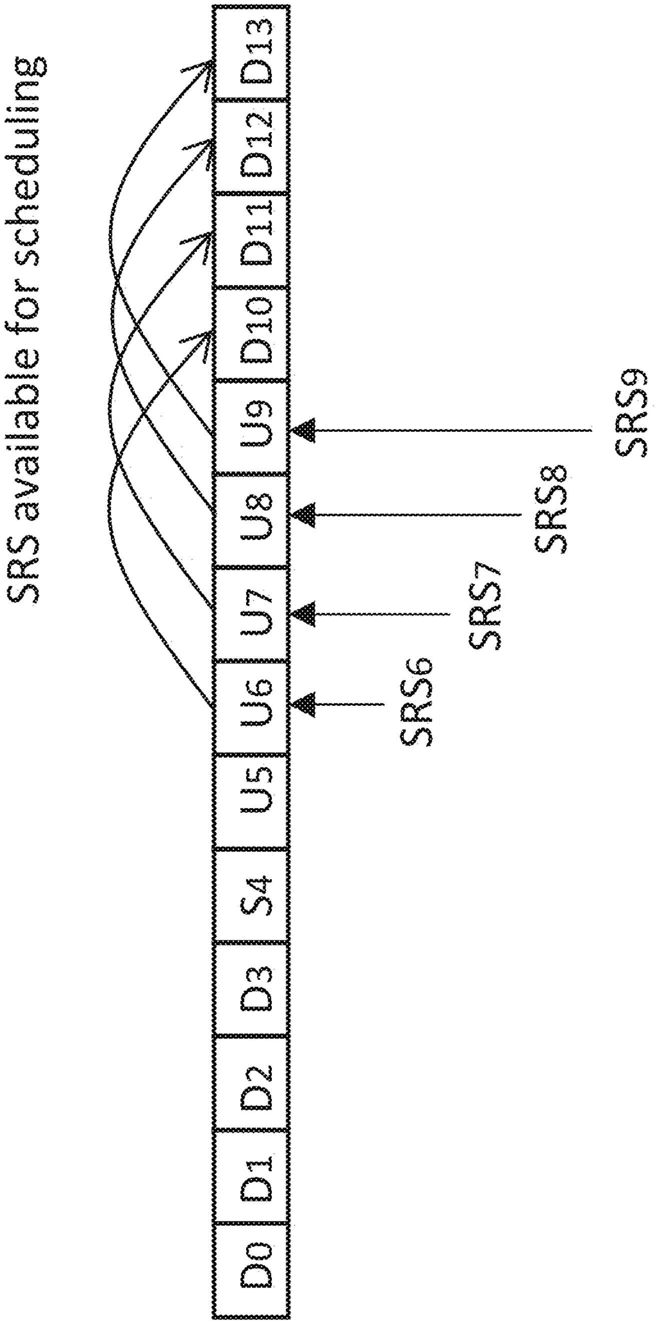
FIG. 10 is a timing diagram that illustrates an example frame structure and staggered SRS transmission according to an embodiment.

FIG. 10 is a timing diagram that illustrates an example frame structure and staggered transmission of SRS. This timing diagram illustrates an example frame structure with 4 downlink slots (D), 1 special slot (S), and 5 uplink slots (U). SRS can be wirelessly transmitted by UEs in different uplink slots. For example, SRS can be transmitted in 4 of the 5 uplink slots in FIG. 10. An uplink slot can include one or more SRS symbols. As an example, 2 SRS symbols can be transmitted by a UE in a 14 symbol uplink slot. In this example, the uplink slot can also include 1 Physical Uplink Control Channel (PUCCH) symbol and 11 Physical Uplink Shared Channel (PUSCH) symbols.

Referring to FIG. 10, a first set of one or more UEs can transmit SRS during uplink slot U6. The SRS channel estimate can be generated and available for scheduling at downlink slot $D_{10}$. Other sets of one or more UEs can transmit SRS during uplink slots $U_7$, $U_8$, and $U_9$ and corresponding channel SRS estimates can be available for scheduling at downlink slots $D_{11}$, $D_{12}$, and $D_{13}$, respectively. In the example of FIG. 10, SRS channel estimates are available four slots after SRS transmission due to a SRS channel estimate processing delay.

Scheduling wireless communications and/or MCS selections can be performed based on time delays of SRS channel estimates. The time delays of SRS channel estimates for UEs are aging metrics associated with the UEs. Any suitable principles and advantages of using one or more aging metrics disclosed herein can be applied in the context of staggered SRS transmission, such as in the example of FIG. 10. UEs can be scheduled for downlink transmissions with less aged SRS transmissions when the UEs transmit SRS in different time slots. For example, a UE that transmits a SRS in a first uplink slot can be scheduled in a downlink slot before another UE that transmits an SRS in a second uplink slot that follows the first uplink slot.

With staggered SRS transmission, UEs having minimum latency and/or minimum aged SRS channel estimates can be scheduled for downlink transmissions in certain applications. For example, with reference to FIG. 10, a UE that transmits SRS during uplink slot $U_7$ can be scheduled in downlink slot $D_{10}$, another UE that transmits SRS during uplink slot $U_8$ can be scheduled in downlink slot $D_{11}$, etc. In the example of FIG. 10, SRS channel estimates with minimum latency and/or minimum aging can be available in each downlink slot. With more uplink slots, there can be more opportunities to stagger SRS transmission. The scheduling is not limited to the downlink slots with minimum aging relative to SRS transmission. Later slots with higher aging are also possible with a corresponding trade-off in performance. However, for given downlink slots, staggering SRS transmission increases the likelihood of scheduler finding UEs with more favorable aging metrics across all slots.

In some applications, SRS can be transmitted in a special slot and in uplink slots. This can result in SRS estimates that are available for scheduling at staggered times.

According to various applications, SRS can be transmitted during one or more uplink slots and become available during another uplink slot before the first downlink slot following the SRS transmission.

Any suitable principles and advantages disclosed herein can be implemented in multi-cell and/or multi-transmission/reception point (TRP) networks. In such networks a TRP can be a gNB, a remote radio unit (RRU), or a relay node (e.g., an integrated access backhaul (IAB) node). TRPs can cooperatively transmit to and/or receive from a UE.

Figure 11:
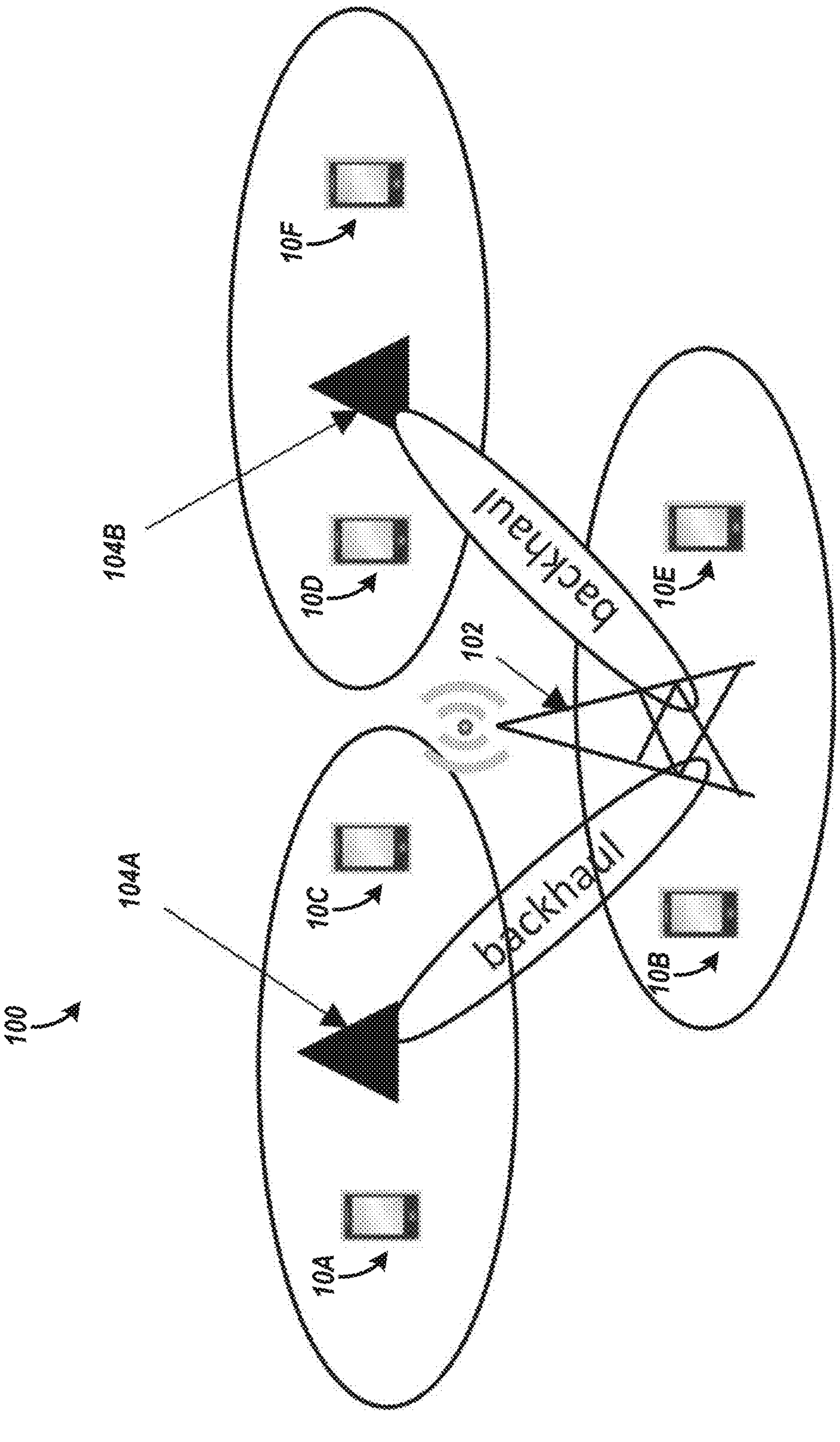
FIG. 11 illustrates an example multi-transmission/reception point network.

FIG. 11 illustrates an example multi-TRP network 100. In the multi-TRP network 100, a network system includes a base station 102 and relay nodes 104A and 104B. UEs 10A, 10B, 10C, 10D, 10E and 10F wireless communicate with the network system in the multi-TRP network 100. SRS can be transmitted by UEs 10A to 10F to the base station 102. This transmission can be direct or by way of one or more relays 104A, 104B with backhaul to the base station 102. There can be intra-cell interference between SRS from different UEs 10A to 10F. Accordingly, not all UEs 10A to 10F can transmit SRS every special slot. UEs 10A to 10F and/or their antenna ports can be partitioned into different disjoint transmission groups. Any suitable combination of features of the methods disclosed herein can be applied to mitigate channel aging effects.

Although FIG. 11 illustrates relay nodes 104A and 104B, any other suitable TRP can alternatively or additionally be implemented. Such other TRPs can cooperatively transmit to and/or receive from a UE. In some instances, one or more relay nodes and one or more other TRPs can cooperatively transmit to and/or receive from a UE.

Figure 12:
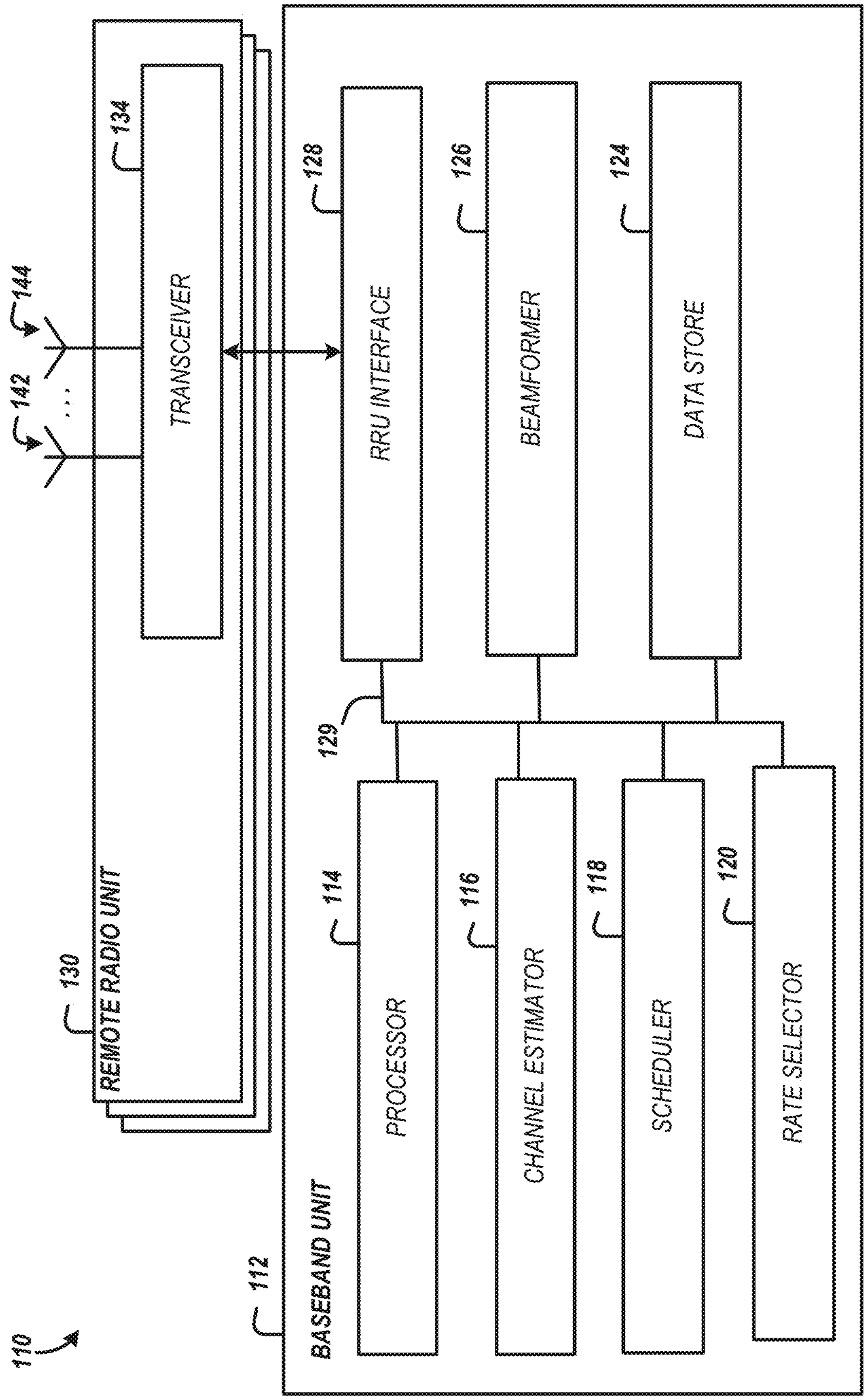
FIG. 12 is a block diagram of an example network system with scheduling and/or rate selection based on channel estimate aging according to an embodiment.

A network system can be configured to schedule wireless communications and/or perform rate selection based on channel estimate aging in accordance with any suitable principles and advantages disclosed herein. The network system can exchange TDD MIMO information with UEs. FIG. 12 illustrates an example network system 110. The network system 110 can operate in any suitable network environment, such as the network environment 230 of FIG. 13 and/or any suitable network environment.

FIG. 12 is a block diagram illustrating an example network system 110 that includes baseband unit (BBU) 112 and remote radio units (RRUs) 130 according to an embodiment. The BBU 112 can schedule wireless communications and/or perform rate selection in accordance with any suitable principles and advantages disclosed herein. The BBU 112 includes at least one processor and stores instructions that, when executed by the at least one processor, can cause the BBU 112 can perform any suitable baseband operations disclosed herein. The BBU 112 can be coupled with at least one remote radio unit 130. The one or more remote radio units 130 can wirelessly communicate with UEs based on the scheduling and rate selection performed by the BBU 112. The BBU 112 can be coupled with a plurality of remote radio units 130 as illustrated. Such remote radio units 130 can be distributed. The remote radio units 130 and/or fronthaul circuitry can perform radio frequency processing.

A remote radio unit 130 can include one or more antennas, such as at least a first antenna 142 and a second antenna 144, for wireless communications. The wireless communications can be, for example, TDD MIMO wireless communications. A remote radio unit 130 can include any suitable number of antennas and/or arrays of antennas. The antennas 142 and 144 of the RRU 130 are coupled with a transceiver 134. The transceiver 134 can perform any suitable radio frequency processing to support wireless communications. The transceiver 134 includes a receiver and a transmitter. The receiver can process signals received via the antennas 142 and/or 144. The transceiver 134 can provide the processed signals to an RRU interface 128 included in the BBU 112. The transceiver 134 can include any suitable number of receive paths. The transmitter can process signals received from the BBU 112 for transmission via the antennas 142 and/or 144. The transmitter of the transceiver 134 can provide signals to the antennas 142 and/or 144 for transmission. The transceiver 134 can include any suitable number of transmit paths. The transceiver 134 can include different transmit and receive paths for each antenna 142 and 144.

As illustrated, the BBU 112 includes a processor 114, a channel estimator 116, a scheduler 118, a rate selector 120, data store 124, a beamformer 126, an RRU interface 128, and a bus 129. The bus 129 can couple several elements of the BBU 112. Data can be communicated between elements of the BBU 112 over the bus 129.

The processor 114 can include any suitable physical hardware configured to perform the functionality described with reference to the processor 114. The processor 114 can manage communications between the network system 110 and UEs and/or network nodes. For example, the processor 114 can cause control information and data to be wirelessly sent to UEs via one or more RRUs 130. The processor 114 can include a processor configured with specific executable instructions, a microprocessor, a microcontroller, a digital signal processor (DSP), an application specific integrated circuit (ASIC), a programmable logic device such as field programmable gate array (FPGA), the like, or any combination thereof designed to perform the functions described herein. The processor 114 can be implemented by any suitable combination of computing devices and/or discrete processing circuits in certain applications.

The channel estimator 116 can generate channel estimates based on reference signals received from UEs. For example, the channel estimator 116 can generate channel estimates based on SRS received from UEs. The channel estimator 116 can generate channel estimates for various communication channels in a wireless communication environment. The channel estimator 116 can also generate timing information associated with the channel estimates. The channel estimator 116 can generate aging metrics associated with the channel estimates. The channel estimator 116 can be implemented by dedicated circuitry and/or by circuitry of the processor 114. In some instances, the channel estimator 116 can include circuitry for channel estimation for SRS and/or CSI-RS.

The scheduler 118 can schedule wireless communications between the network system 110 and UEs. The scheduler 118 can schedule wireless communications based on aging metrics associated with channel estimates in accordance with any suitable principles and advantages disclosed herein. This scheduling can involve one or more of only scheduling UEs and antenna ports with the most recent channel estimates, using aging metrics in user priority computations, or reducing a number of layers for wireless communication with a cluster of UEs during a time slot based on aging metrics. The scheduler 118 can be implemented by dedicated circuitry and/or by circuitry of the processor 114.

The rate selector 120 can perform user rate selection for wireless communications between the network system 110 and UEs. The rate selector 120 can perform MCS selection based on aging metrics associated with channel estimates in accordance with any suitable principles and advantages disclosed herein. This rate selection can involve backoff in MCS based on the aging metrics indicating that channel estimates have increased in age. The rate selector 120 can be implemented by dedicated circuitry and/or by circuitry of the processor 114.

As illustrated, the processor 114 is in communication with the data store 124. The data store 124 can store instructions that can be executed by one or more processors (e.g., including one or more of the processor 114, the channel estimator 116, the scheduler 118, or the rate selector 120) to implement any suitable combination of the features described herein. The data store 124 can retain information associated with one or more of aging metrics, user selection, user priority, rate selection, or the like. The data store 124 can store any other suitable data for the BBU 112.

The beamformer 126 can generate parameters for serving nodes for UEs. The parameters can include one or more of transmission mode, time, frequency, power, beamforming matrix, tone allocation, or channel rank. The beamformer 126 can determine desirable and/or optimal parameters for RRUs 130 coupled with the BBU 112 that facilitate a network-wide enhancement and/or optimization of downlink data transmissions. Similar functionality can be implemented for receiving uplink data transmission. The beamformer 126 is an example of an advanced precoding block that can enhance wireless communication in a TDD MIMO network. The beamformer 126 can generate a precoder that mitigates and/or cancels intra-cell interference.

The illustrated processor 114 is in communication the RRU interface 128. The RRU interface 128 can be any suitable interface for proving signals to an RRU 130 and receiving signals from the RRU 130. As an example, the RRU interface 128 can be a Common Public Radio Interface.

Figure 13:
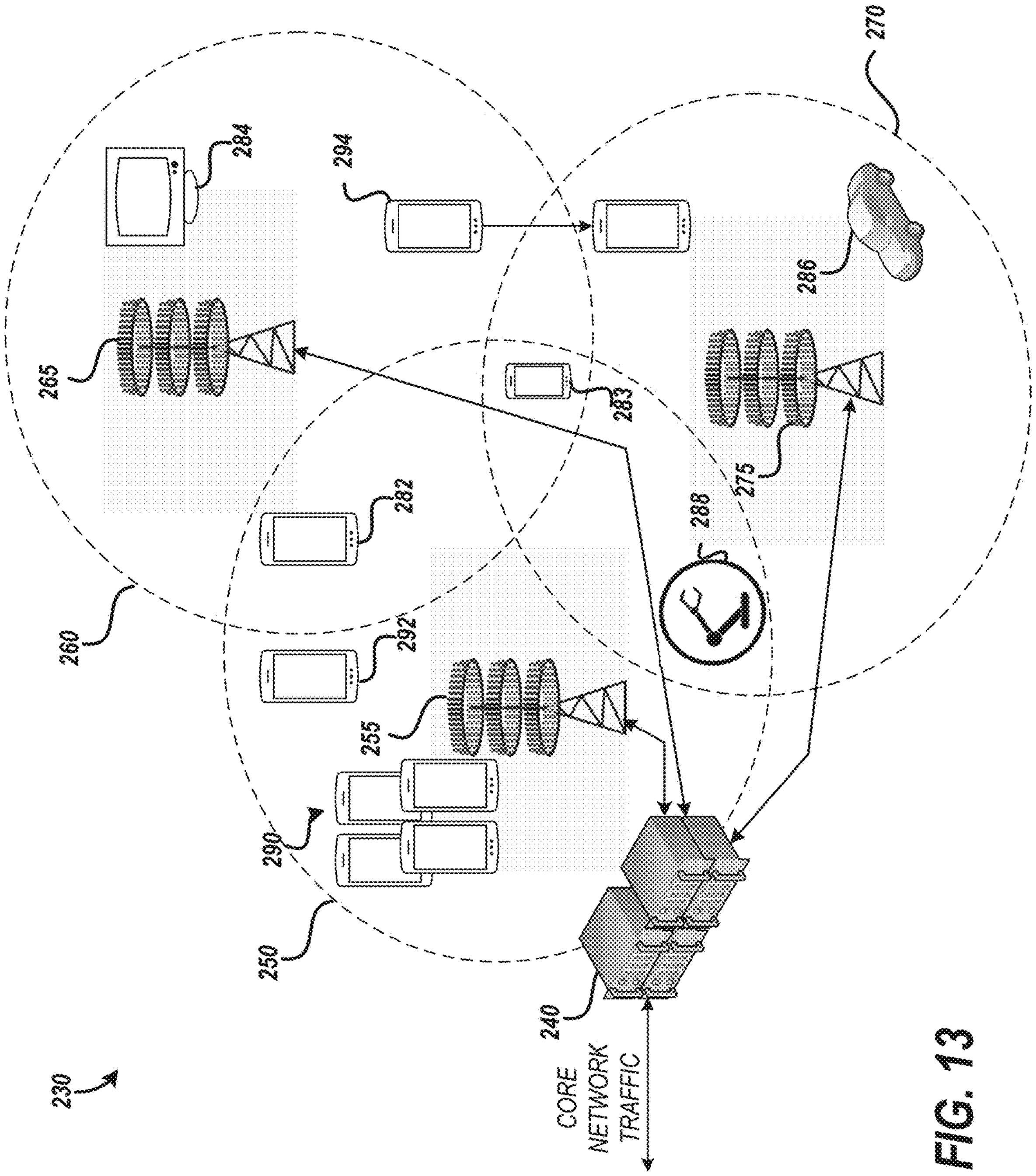
FIG. 13 is a diagram illustrating an example multiple-input multiple-output (MIMO) network environment in which scheduling and/or rate selection based on channel estimate aging can be implemented.

FIG. 13 is a diagram illustrating an example multiple-input multiple-output (MIMO) network environment 230 in which scheduling and/or rate selection based on channel estimate aging can be implemented. Various UEs can wirelessly communicate with a network system in the MIMO network environment 230. Such wireless communications can achieve high throughputs. The wireless communications can be TDD communications. Antennas of MIMO network environment 230 for wirelessly communicating with UEs can be distributed. Channel estimates for channels between different nodes can be performed in the MIMO network environment 230 based on SRS. Scheduling and/or rate selections based on channel estimate aging in accordance with any suitable principles and advantages disclosed herein can be implemented in the MIMO network environment 230. The BBU 240 of the network system can perform such scheduling and/or rate selection.

Various standards and/or protocols may be implemented in the MIMO network environment 230 to wirelessly communicate data between a base station and a wireless communication device. Some wireless devices may communicate using an orthogonal frequency-division multiplexing (OFDM) digital modulation scheme via a physical layer. Example standards and protocols for wireless communication in the network environment 230 can include the third generation partnership project (3GPP) Long Term Evolution (LTE), Long Term Evolution Advanced (LTE Advanced), 3GPP New Radio (NR) also known as 5G, Global System for Mobile Communications (GSM), Enhanced Data Rates for GSM Evolution (EDGE), Worldwide Interoperability for Microwave Access (WiMAX), and the IEEE 802.11 standard, which may be known as Wi-Fi. In some systems, a radio access network (RAN) may include one or more base stations associated with one or more evolved Node Bs (also commonly denoted as enhanced Node Bs, eNodeBs, or eNBs), gNBs, or any other suitable Node Bs (xNBs). In some other embodiments, radio network controllers (RNCs) may be provided as the base stations. A base station provides a bridge between the wireless network and a core network such as the Internet. The base station may be included to facilitate exchange of data for the wireless communication devices of the wireless network. A base station can determine aging metrics, perform scheduling, and perform rate selection in accordance with any suitable principles and advantages disclosed herein.

A wireless communication device may be referred to as a user equipment (UE). The UE may be a device used by a user such as a smartphone, a laptop, a tablet computer, cellular telephone, a wearable computing device such as smart glasses or a smart watch or an earpiece, one or more networked appliances (e.g., consumer networked appliances or industrial plant equipment), an industrial robot with connectivity, or a vehicle. In some implementations, the UE may include a sensor or other networked device configured to collect data and wirelessly provide the data to a device (e.g., server) connected to a core network such as the Internet. Such devices may be referred to as Internet of Things (IoT) devices. A downlink (DL) transmission generally refers to a communication from the base transceiver station (BTS) or eNodeB to a UE. An uplink (UL) transmission generally refers to a communication from the UE to the BTS.

FIG. 13 illustrates a cooperative, or cloud radio access network (C-RAN) environment 230. In the network environment 230, the eNodeB functionality is subdivided between a baseband unit (BBU) 240 and multiple remote radio units (RRUs) (e.g., RRU 255, RRU 265, and RRU 275). The network system of FIG. 13 includes the BBU 240 and the RRUs 255, 265, and 275. An RRU may include multiple antennas. The RRU and/or a TRP may be referred to as a serving node. The BBU 240 may be physically connected to the RRUs 255, 265, 275 such as via an optical fiber connection. The BBU 240 may provide operational information to an RRU to control transmission and reception of signals from the RRU along with control data and payload data to transmit. The RRU may provide data received from UEs within a service area associated with the RRU to the network. As shown in FIG. 13, the RRU 255 provides service to devices within a service area 250. The RRU 265 provides service to devices within a service area 260. The RRU 275 provides service to devices within a service area 270. For example, wireless downlink transmission service may be provided to the service area 270 to communicate data to one or more devices within the service area 270.

In the network environment 230, a network system can wirelessly communicate with UEs via distributed MIMO. For example, the UE 283 can wirelessly communicate MIMO data with antennas of the network system that include at least one antenna of the RRU 255, at least one antenna of the RRU 265, and at least one antenna of the RRU 275. As another example, the UE 282 can wirelessly communicate MIMO data with distributed antennas that include at least one antenna of the RRU 255 and at least one antenna of the RRU 265. As one more example, the UE 288 can wirelessly communicate MIMO data with distributed antennas that include at least one antenna of the RRU 255 and at least one antenna of the RRU 275. Any suitable principles and advantages of the reference signal channel estimation disclosed herein can be implemented in such distributed MIMO applications, for example.

The illustrated RRUs 255, 265, and 275 include multiple antennas and can provide MIMO communications. For example, an RRU may be equipped with various numbers of transmit antennas (e.g., 2, 4, 8, or more) that can be used simultaneously for transmission to one or more receivers, such as a UE. Receiving devices may include more than one receive antenna (e.g., 2, 4, etc.). An array of receive antennas may be configured to simultaneously receive transmissions from the RRU. Each antenna included in an RRU may be individually configured to transmit and/or receive according to a specific time, frequency, power, and direction configuration. Similarly, each antenna included in a UE may be individually configured to transmit and/or receive according to a specific time, frequency, power, and direction configuration. The configuration may be provided by the BBU 240.

The service areas shown in FIG. 13 may provide communication services to a heterogeneous population of user equipment. For example, the service area 250 may include a cluster of UEs 290 such as a group of devices associated with users attending a large event. The service area 250 can also include an additional UE 292 that is located away from the cluster of UEs 290. A mobile user equipment 294 may move from the service area 260 to the service area 270. Another example of a mobile user equipment is a vehicle 286 which may include a transceiver for wireless communications for real-time navigation, on-board data services (e.g., streaming video or audio), or other data applications. The network environment 230 may include semi-mobile or stationary UEs, such as robotic device 288 (e.g., robotic arm, an autonomous drive unit, or other industrial or commercial robot) or a television 284, configured for wireless communications.

A user equipment 282 may be located with an area with overlapping service (e.g., the service area 250 and the service area 260). Each device in the network environment 230 may have different performance needs which may, in some instances, conflict with the needs of other devices.

Scheduling wireless communications and/or rate selection based on aging metrics in accordance with any suitable principles and advantages disclosed herein can be performed in the network environment 230. With such scheduling and/or rate selection, intra-cell interference can be reduced and/or mitigated.

Depending on the embodiment, certain acts, events, or functions of any of the methods or algorithms described herein can be performed in a different sequence, can be added, merged, or left out altogether (e.g., not all described operations or events are necessary for the practice of the method or algorithm). Moreover, in certain embodiments, operations, or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," "such as," and the like, unless specifically stated otherwise, or otherwise understood within the context as used, is generally intended to convey that certain embodiments include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without other input or prompting, whether these features, elements, and/or steps are included or are to be performed in any particular embodiment. The terms "comprising," "including," and the like are synonymous and are used inclusively, in an open-ended fashion, and do not exclude additional elements, features, acts, operations, and so forth. Additionally, the words “herein,” “above,” “below,” and words of similar import, when used in this application, shall refer to this application as a whole and not to any particular portions of this application. Where the context permits, words in the above Detailed Description of Certain Embodiments using the singular or plural may also include the plural or singular, respectively. Also, the term “or” is used in its inclusive sense (and not in its exclusive sense) so that when used, for example, to connect a list of elements, the term “or” means one, some, or all of the elements in the list.

Disjunctive language such as the phrase “at least one of X, Y, Z,” unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated or generally understood from context, articles such as “a” or “an” should generally be interpreted to include one or more described items. Accordingly, phrases such as “a device configured to” are intended to include one or more recited devices. Such one or more recited devices can also be collectively configured to carry out the stated recitations. For example, “a processor configured to carry out recitations A, B and C” can include a first processor configured to carry out recitation A working in conjunction with a second processor configured to carry out recitations B and C.

The word “coupled,” as generally used herein, refers to two or more elements that may be either directly coupled to each other, or coupled by way of one or more intermediate elements. Likewise, the word “connected,” as generally used herein, refers to two or more elements that may be either directly connected, or connected by way of one or more intermediate elements. Connections can be via an air interface and/or via wires and/or via optical fiber and/or via any other suitable connection.

As used herein, the terms “determine” or “determining” encompass a wide variety of actions. For example, “determining” may include calculating, computing, processing, deriving, generating, obtaining, looking up (e.g., looking up in a table, a database or another data structure), ascertaining and the like via a hardware element without user intervention. Also, “determining” may include receiving (e.g., receiving information), accessing (e.g., accessing data in a memory) and the like via a hardware element without user intervention. Also, “determining” may include resolving, selecting, choosing, establishing, and the like via a hardware element without user intervention.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific computer-executable instructions stored on a non-transitory computer-readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method of scheduling wireless communications based on channel estimate aging, the method comprising:

generating channel estimates based on signals wirelessly transmitted by user equipments;

determining aging metrics associated with the channel estimates based on ages of the channel estimates, the aging metrics comprising a first aging metric for a first channel and a second aging metric for a second channel; and scheduling wireless communications with at least some of the user equipments based on the aging metrics, such that a first wireless data transmission over the first channel is prioritized over a second wireless data transmission over the second channel when the first aging metric is associated with a more recent channel estimate than the second aging metric, wherein the scheduling comprises:

selecting a first group of antenna ports of the user equipments for wireless communication during a time slot based on respective first aging metrics of the aging metrics indicating lower channel uncertainty, and not scheduling a second group of antenna ports of the user equipments for wireless communication during the time slot based on respective second aging metrics of the aging metrics indicating higher channel uncertainty, wherein the first aging metrics comprise the first aging metric, and the second aging metrics comprise the second aging metric.

2. The method of claim 1, wherein the signals wirelessly transmitted by the user equipments are sounding reference signals.

3. The method of claim 2, wherein a first sounding reference signal of the sounding reference signals is wirelessly transmitted by a first user equipment of the user equipments in a first time slot, and a second sounding reference signal of the sounding reference signals is wirelessly transmitted by a second user equipment of the user equipments in a second time slot, the second time slot following the first time slot.

4. The method of claim 1, wherein the wireless communications are time division duplexing (TDD) multiple-input multiple-output (MIMO) wireless communications.

5. The method of claim 1, wherein an aging metric of the aging metrics is solely based on a time delay associated with a respective channel estimate.

6. The method of claim 1, wherein an aging metric of the aging metrics is based on a mobility of a channel associated with a respective channel estimate and a time delay associated with the respective channel estimate.

7. The method of claim 1, wherein an aging metric of the aging metrics is based on a prediction of quality of a channel associated with a respective channel estimate and a time delay associated with the respective channel estimate.

8. The method claim 1, wherein the scheduling comprises using at least some of the aging metrics in determining user equipment priority for a time slot.

9. The method of claim 8, wherein the scheduling comprises reducing a number of layers for the wireless communications for a time slot.

10. The method claim 1, wherein the scheduling comprises reducing a number of layers for the wireless communications for a time slot.

11. The method of claim 1, wherein the scheduling comprises using at least some of the aging metrics in determining user equipment priority for a time slot.

12. The method of claim 11, wherein the determining user equipment priority for the time slot is also based on one or more Quality of Service metrics.

13. The method of claim 11, wherein the scheduling comprises reducing a number of layers for the wireless communications for a time slot.

14. The method of claim 1, wherein the scheduling comprises reducing a number of layers for the wireless communications for a time slot.

15. The method of claim 1, further comprising performing modulation and coding scheme selection for a group of antenna ports of the user equipments scheduled for a time slot based on at least some of the aging metrics.

16. Non-transitory, computer-readable storage comprising computer-executable instructions, wherein the computer-executable instructions, when executed by a baseband unit, cause a method to be performed, the method comprising:

generating channel estimates based on signals wirelessly transmitted by user equipments;

determining aging metrics associated with the channel estimates based on ages of the channel estimates, the aging metrics comprising a first aging metric for a first channel and a second aging metric for a second channel; and scheduling wireless communications with at least some of the user equipments based on the aging metrics, such that a first wireless data transmission over the first channel is prioritized over a second wireless data transmission over the second channel when the first aging metric is associated with a more recent channel estimate than the second aging metric, wherein the scheduling comprises:

selecting a first group of antenna ports of the user equipments for wireless communication during a time slot based on respective first aging metrics of the aging metrics indicating lower channel uncertainty, and not scheduling a second group of antenna ports of the user equipments for wireless communication during the time slot based on respective second aging metrics of the aging metrics indicating higher channel uncertainty, wherein the first aging metrics comprise the first aging metric, and the second aging metrics comprise the second aging metric.

17. A system for wireless communications, the system comprising:

a baseband unit comprising at least one processor and storing instructions, wherein the instructions, when executed by the at least one processor, cause the baseband unit to perform operations, the operations comprising:

generating channel estimates based on signals received from user equipments;

determining aging metrics associated with the channel estimates based on ages of the channel estimates, the aging metrics comprising a first aging metric for a first channel and a second aging metric for a second channel; and scheduling wireless communications with at least some of the user equipments based on the aging metrics, such that a first wireless data transmission over the first channel is prioritized over a second wireless data transmission over the second channel when the first aging metric is associated with a more recent channel estimate than the second aging metric, wherein the scheduling comprises:

selecting a first group of antenna ports of the user equipments for wireless communication during a time slot based on respective first aging metrics of the aging metrics indicating lower channel uncertainty, and not scheduling a second group of antenna ports of the user equipments for wireless communication during the time slot based on respective second aging metrics of the aging metrics indicating higher channel uncertainty, wherein the first aging metrics comprise the first aging metric, and the second aging metrics comprise the second aging metric.

18. The system of claim 17, further comprising one or more radio units in communication with the baseband unit, the one or more radio units configured to wirelessly communicate with the at least some of the user equipments via the wireless communications.

19. The system of claim 18, wherein the one or more radio units comprise distributed remote radio units.

* * * * *